(12) United States Patent
Pringle, IV et al.

(10) Patent No.: US 11,117,183 B1
(45) Date of Patent: Sep. 14, 2021

(54) END EFFECTORS AND FEEDERS FOR SWAGING OPERATIONS

(71) Applicant: The Boeing Company, Chicago, IL (US)

(72) Inventors: John W. Pringle, IV, Torrance, CA (US); David Pedersen, Irvine, CA (US); Matt Barnhart, Seal Beach, CA (US); David Lepore, Long Beach, CA (US); Yousef Aziz, Torrance, CA (US); Jigar Patel, Anaheim, CA (US); Surajit Roy, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/846,200

(22) Filed: Apr. 10, 2020

(51) Int. Cl.
| | |
|---|---|
| *B21J 15/02* | (2006.01) |
| *B23P 19/00* | (2006.01) |
| *B21J 15/32* | (2006.01) |
| *F16B 19/05* | (2006.01) |
| *F16B 39/02* | (2006.01) |
| *B21J 15/14* | (2006.01) |

(52) U.S. Cl.
CPC ............ *B21J 15/022* (2013.01); *B21J 15/32* (2013.01); *B23P 19/006* (2013.01); *B21J 15/142* (2013.01); *B23P 19/003* (2013.01); *B23P 19/005* (2013.01); *F16B 19/05* (2013.01); *F16B 39/026* (2013.01)

(58) Field of Classification Search
CPC ..... B23P 19/001; B23P 19/002; B23P 19/003; B23P 19/004; B23P 19/005; B23P 19/006; B23P 19/06; B23P 19/08; F16B 19/05; F16B 39/026; B21J 15/022; B21J 15/142; B21J 15/32
See application file for complete search history.

(56) References Cited

U.S. PATENT DOCUMENTS

| | | | | |
|---|---|---|---|---|
| 4,852,376 | A * | 8/1989 | Suhov | B21J 15/32 29/812.5 |
| 5,697,521 | A * | 12/1997 | Dixon | B21J 15/022 221/297 |
| 6,145,726 | A * | 11/2000 | Hoof | B23P 19/006 227/107 |
| 9,370,819 | B2 * | 6/2016 | Erickson | B21J 15/022 |
| 10,316,878 | B2 | 6/2019 | Suttle | |
| 2001/0045006 | A1 * | 11/2001 | Zieve | B21J 15/32 29/715 |
| 2007/0157453 | A1 * | 7/2007 | Tomchick | B21J 15/32 29/525.01 |
| 2009/0260413 | A1 * | 10/2009 | Tomchick | B21J 15/32 72/481.1 |

(Continued)

*Primary Examiner* — Matthew P Travers
(74) *Attorney, Agent, or Firm* — Kunzler Bean & Adamson

(57) ABSTRACT

A feeder for a swage gun comprises a collar magazine and a guide-block assembly. The guide-block assembly comprises a guide block that comprises a slot, configured to receive the lock collar from the collar magazine at a first guide-block position along the slot. The guide-block assembly also comprises an actuator, operable to move the lock collar along the slot from the first guide-block position to a second guide-block position. Feeder further comprises a feed tunnel, coupled with the guide-block assembly, and a dispensing bulkhead, coupled with the feed tunnel. Feeder also comprises a gripping assembly, coupled with the dispensing bulkhead.

20 Claims, 24 Drawing Sheets

(56) References Cited

U.S. PATENT DOCUMENTS

| | | | | |
|---|---|---|---|---|
| 2014/0201972 A1* | 7/2014 | Butvin | .................... | B65G 51/02 |
| | | | | 29/505 |
| 2015/0184689 A1* | 7/2015 | Godfrey | .................... | B21J 15/38 |
| | | | | 29/515 |
| 2016/0167108 A1* | 6/2016 | Godfrey | ................ | B23P 19/001 |
| | | | | 29/243.522 |
| 2017/0051777 A1* | 2/2017 | Slaughter | .............. | F16B 39/026 |
| 2017/0056958 A1* | 3/2017 | Erickson | ................. | B21J 15/32 |
| 2017/0368650 A1* | 12/2017 | Eng | ......................... | B25J 9/041 |
| 2020/0094311 A1* | 3/2020 | Chan | ..................... | B23P 19/002 |
| 2020/0094312 A1* | 3/2020 | Chan | ..................... | B21J 15/142 |
| 2020/0114480 A1* | 4/2020 | Lang | ..................... | B23P 19/004 |
| 2020/0261967 A1* | 8/2020 | Buttrick | .................. | B21J 15/32 |

\* cited by examiner

END EFFECTORS AND FEEDERS FOR SWAGING OPERATIONS

TECHNICAL FIELD

The subject matter, disclosed herein, relates to end effectors and feeders for swaging operations.

BACKGROUND

During assembly of a structure, such as an aircraft or a component thereof, at least two layers of the structure must often be secured together with a swaged lock collar as part of a swaging operation. However, space constraints, in many instances imposed by the geometry of the structure, make the necessary swaging operations difficult to perform.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is a feeder for a swage gun. The feeder comprises a collar magazine that is configured to selectively eject a lock collar that has a collar axis. The feeder also comprises a guide-block assembly. The guide-block assembly comprises a guide block that comprises a slot that is configured to receive the lock collar from the collar magazine at a first guide-block position along the slot. The guide-block assembly also comprises an actuator that is operable to move the lock collar along the slot from the first guide-block position to a second guide-block position that is spaced away from the first guide-block position. The feeder further comprises a feed tunnel that is coupled with the guide-block assembly. The feeder additionally comprises a dispensing bulkhead that is coupled with the feed tunnel. The feeder also comprises a gripping assembly that is coupled with the dispensing bulkhead.

The feeder provides for the delivery of lock collars to assembly fasteners in difficult-to-reach and confined spaces. When coupled to the end effector and the swage gun, the feeder promotes automated delivery of the lock collars and performance of swaging operations in confined locations without the need to manually access such locations. The collar magazine enables storage and incremental feeding of many lock collars at a time in preparation for swaging operations. The guide-block assembly enables the collar magazine to drop the lock collars out of the collar magazine and helps to position a single lock collar at a time from the collar magazine into a position conducive for transitioning into the feed tunnel. The feed tunnel promotes retention of several lock collars in preparation for delivery to the dispensing bulkhead. The dispensing bulkhead facilitates secure movement of the lock collars for delivery to the gripping assembly while enabling the gripping assembly to retrieve a single lock collar at a time from the dispensing bulkhead. The gripping assembly enables retention of the lock collar from the dispensing bulkhead and reorientation of the lock collar into an orientation, conducive to swaging operations by the swage gun. Accordingly, the feeder promotes the transfer of lock collars from a centralized storage location and the dispensing of the lock collars individually in front of the swage gun.

Also disclosed herein is end effector for swaging operations. The end effector comprises a swage gun and a feeder. The feeder comprises a collar magazine that is configured to selectively eject a lock collar that has a collar axis. The feeder also comprises a guide-block assembly. The guide-block assembly comprises a guide block that comprises a slot that is configured to receive the lock collar from the collar magazine at a first guide-block position along the slot. The guide-block assembly also comprises an actuator that is operable to move the lock collar along the slot from the first guide-block position to a second guide-block position that is spaced away from the first guide-block position. The feeder also comprises a feed tunnel that is coupled with the guide-block assembly. The feeder further comprises a dispensing bulkhead that is coupled with the feed tunnel. The feeder additionally comprises a gripping assembly that is coupled with the dispensing bulkhead and rotatable relative to the swage gun.

The end effector promotes automated delivery of the lock collars and performance of swaging operations in confined locations without the need to manually access such locations. The feeder provides for the delivery of lock collars to the assembly fasteners in difficult-to-reach and confined spaces. When coupled to the end effector and the swage gun, the feeder promotes automated delivery of the lock collars and performance of swaging operations in confined locations without the need to manually access such locations. The collar magazine enables storage and incremental feeding of many lock collars at a time in preparation for swaging operations. The guide-block assembly enables the collar magazine to drop the lock collars out of the collar magazine and helps to position a single lock collar at a time from the collar magazine into a position conducive for transitioning into the feed tunnel. The feed tunnel promotes retention of several lock collars in preparation for delivery to the dispensing bulkhead. The dispensing bulkhead facilitates secure movement of the lock collars for delivery to the gripping assembly while enabling the gripping assembly to retrieve a single lock collar at a time from the dispensing bulkhead. The gripping assembly enables retention of the lock collar from the dispensing bulkhead and reorientation of the lock collar into an orientation, conducive to swaging operations by the swage gun. Accordingly, the feeder promotes the transfer of lock collars from a centralized storage location and the dispensing of the lock collars individually in front of the swage gun.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1A:
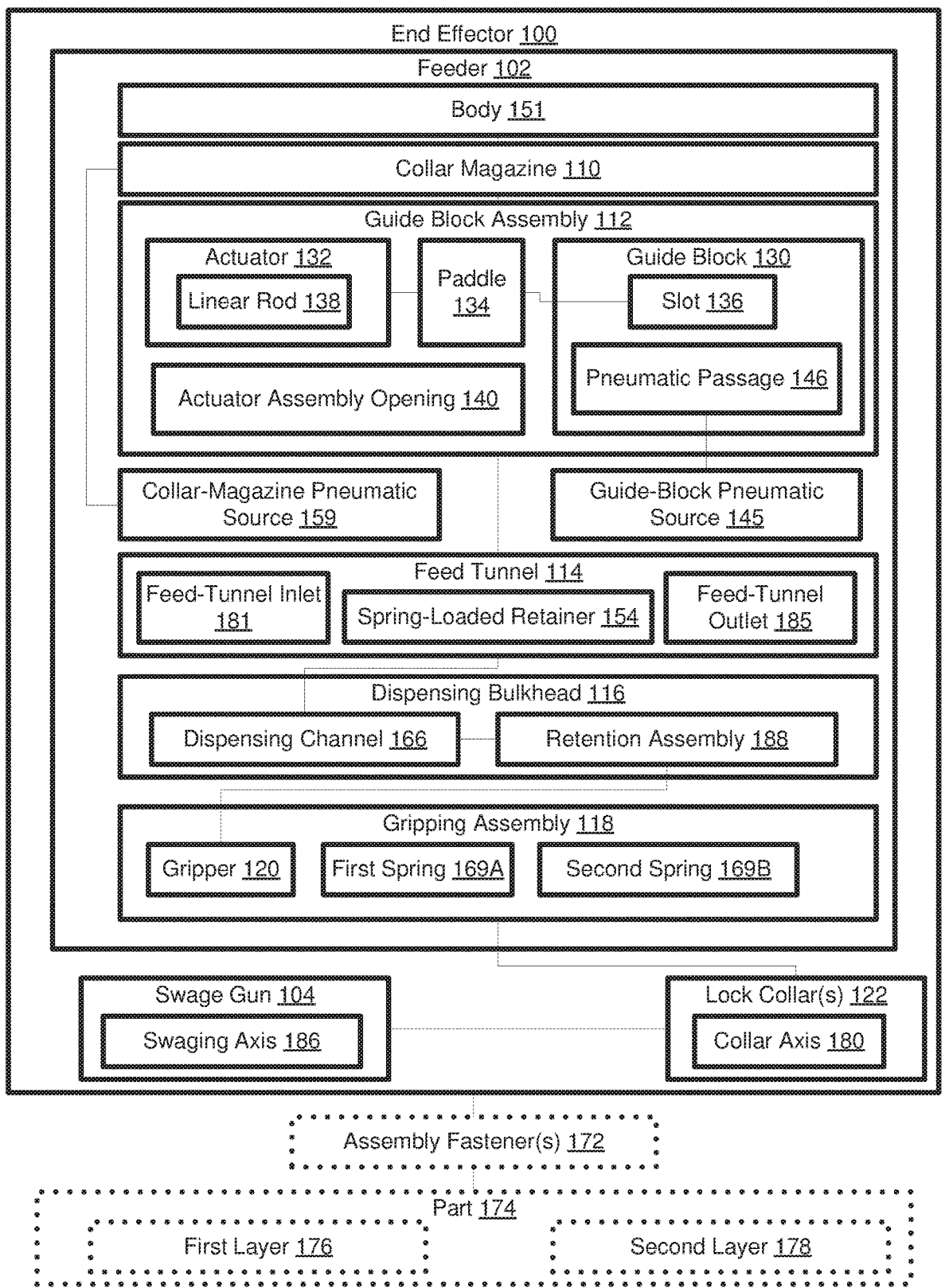
FIGS. 1A, 1B, and 1C, collectively, are a block diagram of an end effector for swaging operations, according to one or more examples of the subject matter, disclosed herein.
Figure 1B:
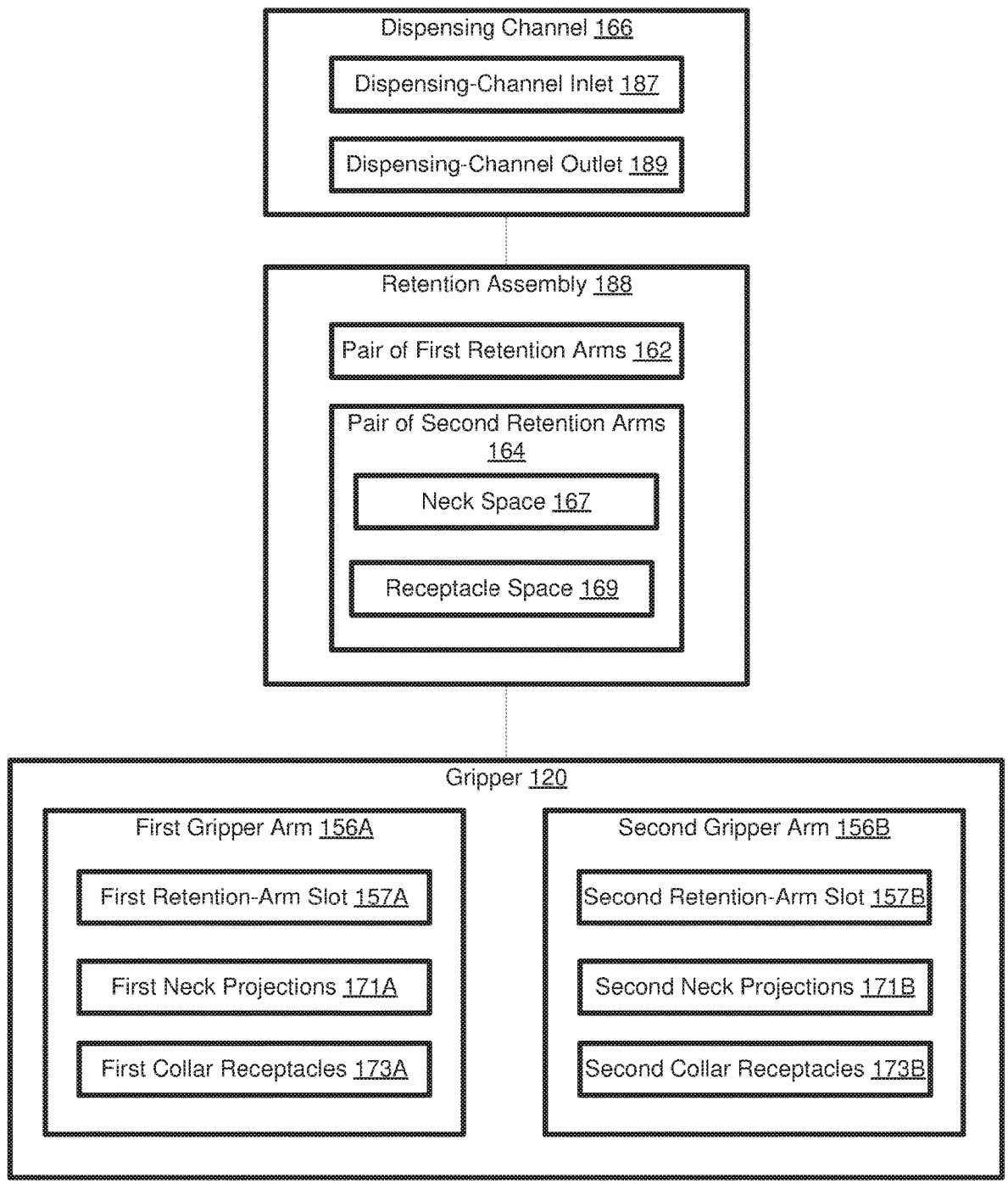
Figure 1C:
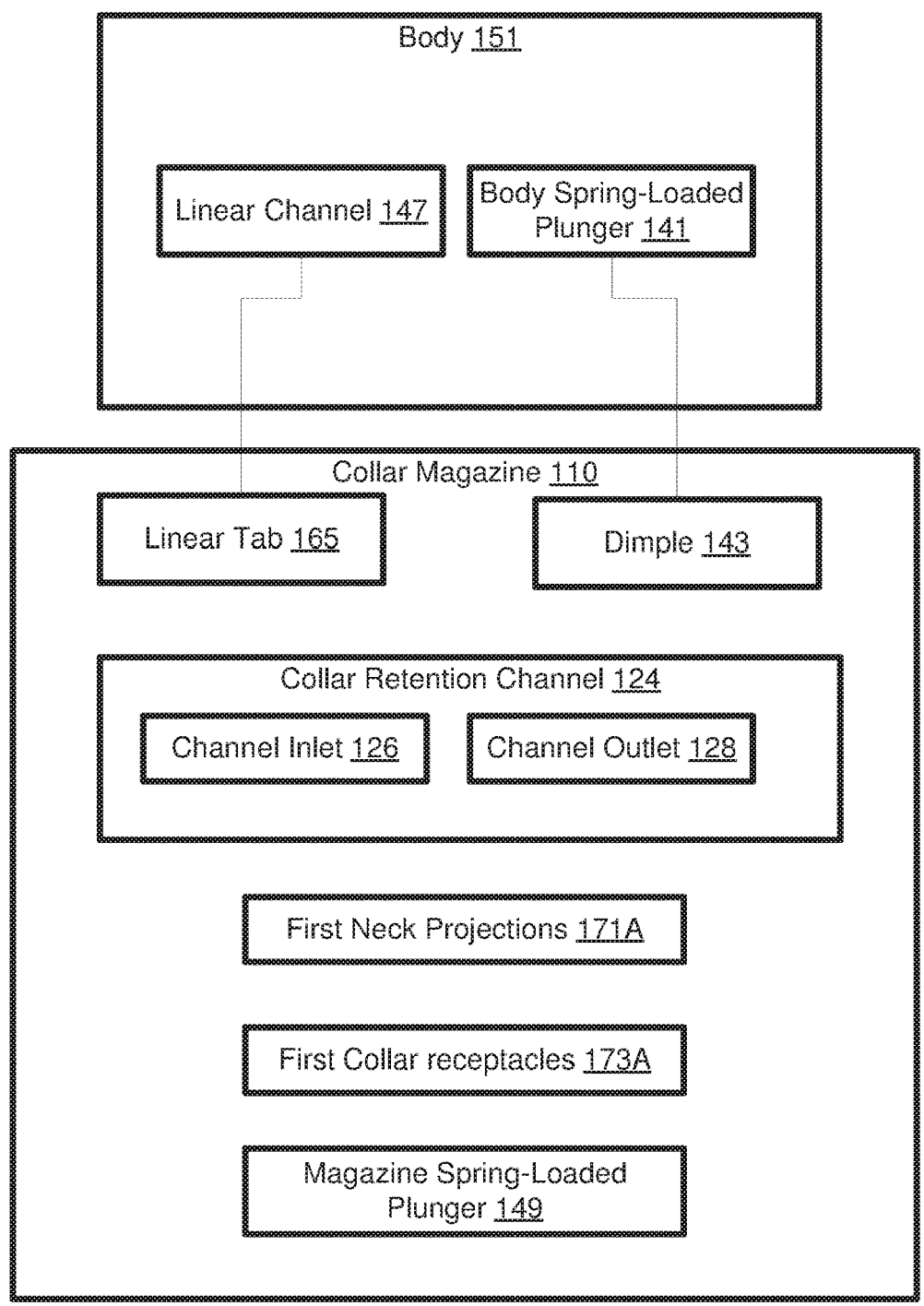
Figure 2:
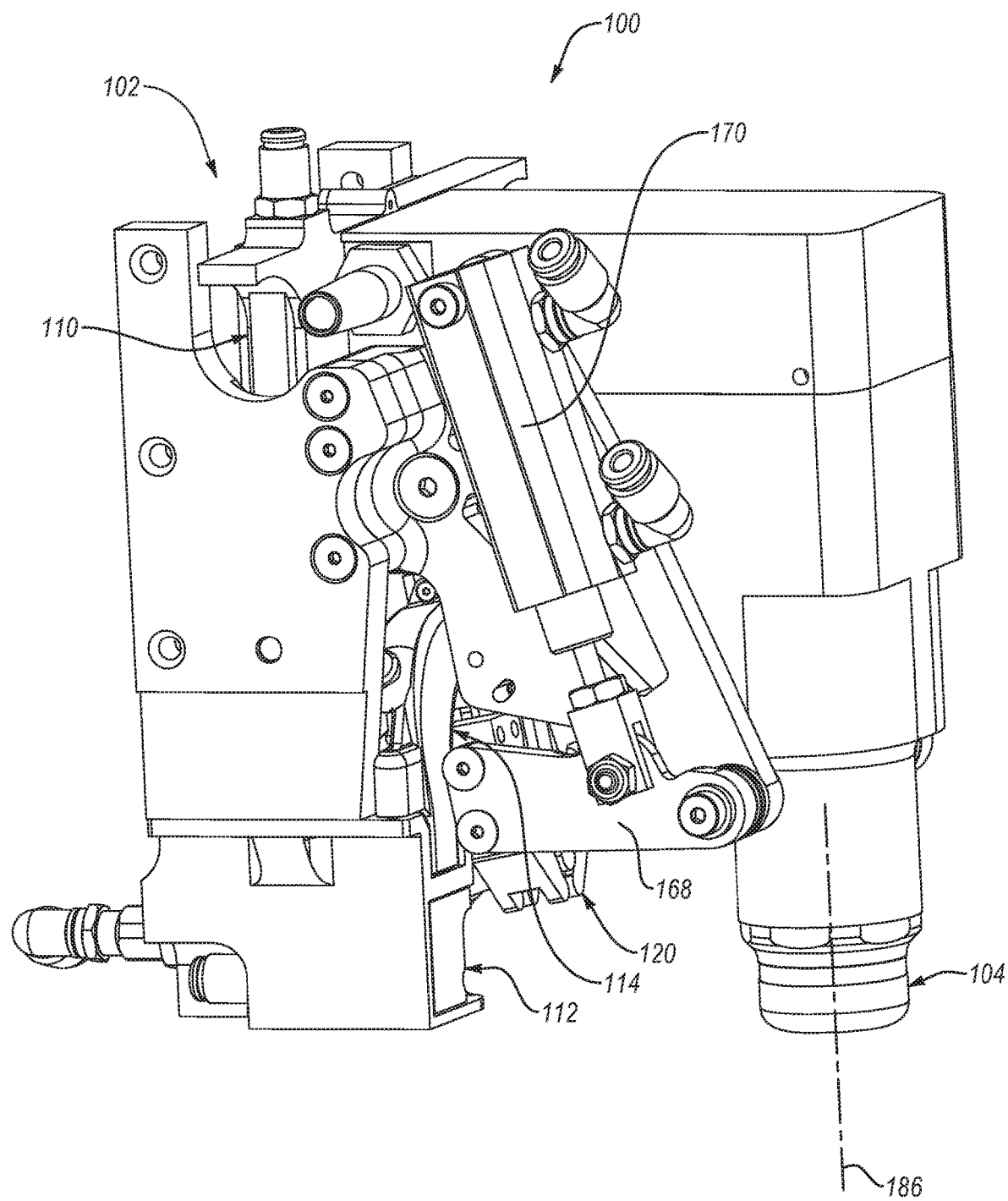
FIG. 2 is a schematic, perspective view of the end effector of FIGS. 1A, 1B, and 1C, according to one or more examples of the subject matter, disclosed herein.

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

Figure 24:
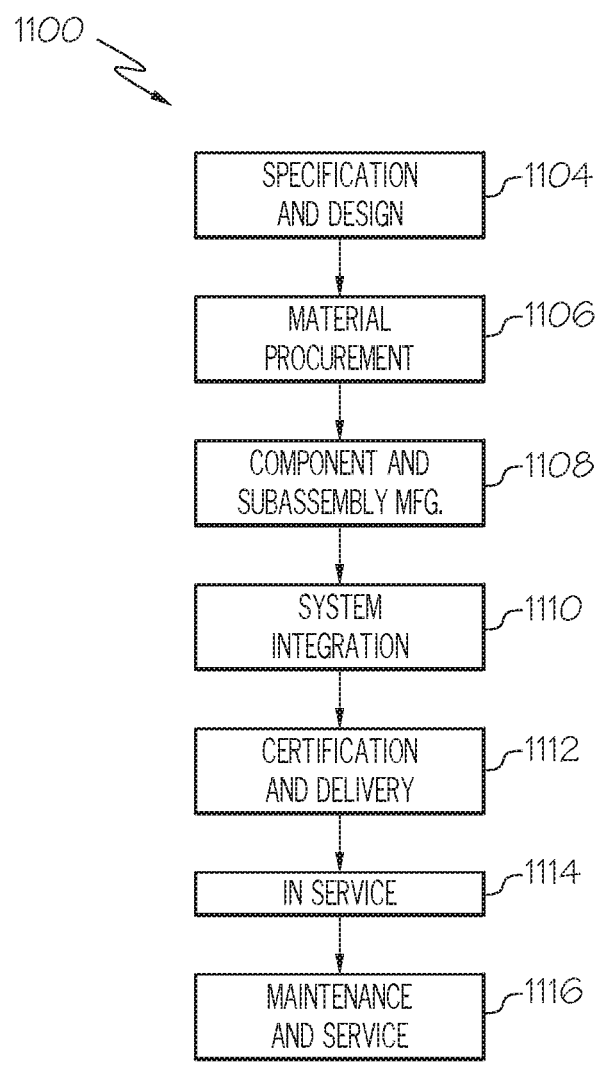
FIG. 24 is a block diagram of aircraft production and service methodology.

In FIG. 24, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 24 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIGS. 1A, 1B, and 1C and particularly to, e.g., FIGS. 2-23 for illustrative purposes only and not by way of limitation, feeder 102 for swage gun 104 is disclosed. Feeder 102 comprises collar magazine 110 that is configured to selectively eject lock collar 122, which has collar axis 180. Feeder 102 also comprises guide-block assembly 112. Guide-block assembly 112 comprises guide block 130 that comprises slot 136 that is configured to receive lock collar 122 from collar magazine 110 at first guide-block position A along slot 136. Guide-block assembly 112 also comprises actuator 132 that is operable to move lock collar 122 along slot 136 from first guide-block position A to second guide-block position B that is spaced away from first guide-block position A. Feeder 102 further comprises feed tunnel 114 that is coupled with guide-block assembly 112. Feeder 102 additionally comprises dispensing bulkhead 116 that is coupled with feed tunnel 114. Feeder 102 also comprises gripping assembly 118 that is coupled with dispensing bulkhead 116. The preceding portion of this paragraph characterizes example one of the subject matter, disclosed herein.

Feeder 102 provides for the delivery of lock collars to assembly fasteners 172 in difficult-to-reach and confined spaces. When coupled to end effector 100 and swage gun 104, feeder 102 promotes automated delivery of the lock collars and performance of swaging operations in confined locations without the need to manually access such locations. Collar magazine 110 enables storage and incremental feeding of many lock collars at a time in preparation for swaging operations. Guide-block assembly 112 enables collar magazine 110 to drop the lock collars out of collar magazine 110 and helps to position a single lock collar at a time from collar magazine 110 into a position, conducive for transitioning into feed tunnel 114. Feed tunnel 114 promotes retention of several lock collars in preparation for delivery to dispensing bulkhead 116. Dispensing bulkhead 116 facilitates secure movement of the lock collars for delivery to gripping assembly 118 while enabling gripping assembly 118 to retrieve a single lock collar at a time from dispensing bulkhead 116. Gripping assembly 118 enables retention of lock collar 122 from dispensing bulkhead 116 and reorientation of lock collar 122 into an orientation, conducive to swaging operations by swage gun 104. Accordingly, feeder 102 promotes the transfer of the lock collars from a centralized storage location and the dispensing of the lock collars individually in front of swage gun 104.

According to one example, a method of using feeder 102 to deliver lock collar 122 to swage gun 104 comprises steps of: (A) translating lock collar 122, in a first orientation, in which collar axis 180 of lock collar 122 is non-parallel relative to swaging axis 186 of swage gun 104, through collar magazine 110; (B) receiving lock collar 122, in the first orientation, from collar magazine 110 in slot 136 of guide-block assembly 112, coupled with collar magazine 110; (C) translating lock collar 122, in the first orientation, along slot 136 of guide-block assembly 112 from first guide-block-assembly position A to second guide-block-assembly position B; (D) receiving lock collar 122, in the first orientation and when in second guide-block-assembly position B, from slot 136 of guide-block assembly 112 into feed tunnel 114; (E) translating lock collar 122, in the first orientation, through feed tunnel 114 and into dispensing bulkhead 116, coupled with feed tunnel 114; (F); translating lock collar 122, in the first orientation, along retention assembly 188 of dispensing bulkhead 116, coupled with feed tunnel 114, from first dispensing-bulkhead position C to second dispensing-bulkhead position D; (G) grasping lock collar 122, in the first orientation and when in second dispensing-bulkhead position D, with gripper 120 of gripping assembly 118, coupled with dispensing bulkhead 116 and with gripper 120 in a receiving position; and (H) pivoting gripping assembly 118, with lock collar 122 grasped by gripper 120 of gripping assembly 118, from the receiving position into a delivery position, where when gripper 120 of gripping assembly 118 is in the delivery position, lock collar 122 grasped by gripper 120 is in a second orientation, in which collar axis 180 of lock collar 122 is parallel relative to swaging axis 186 of swage gun 104.

One example of the definition of collar axis 180 of lock collar 122 is an azimuthal symmetry axis of lock collar 122. As used herein, azimuthal symmetry is rotational symmetry of order n, where n=infinity, with respect to a point (in 2D) or an axis (in 3D).

Figure 21:
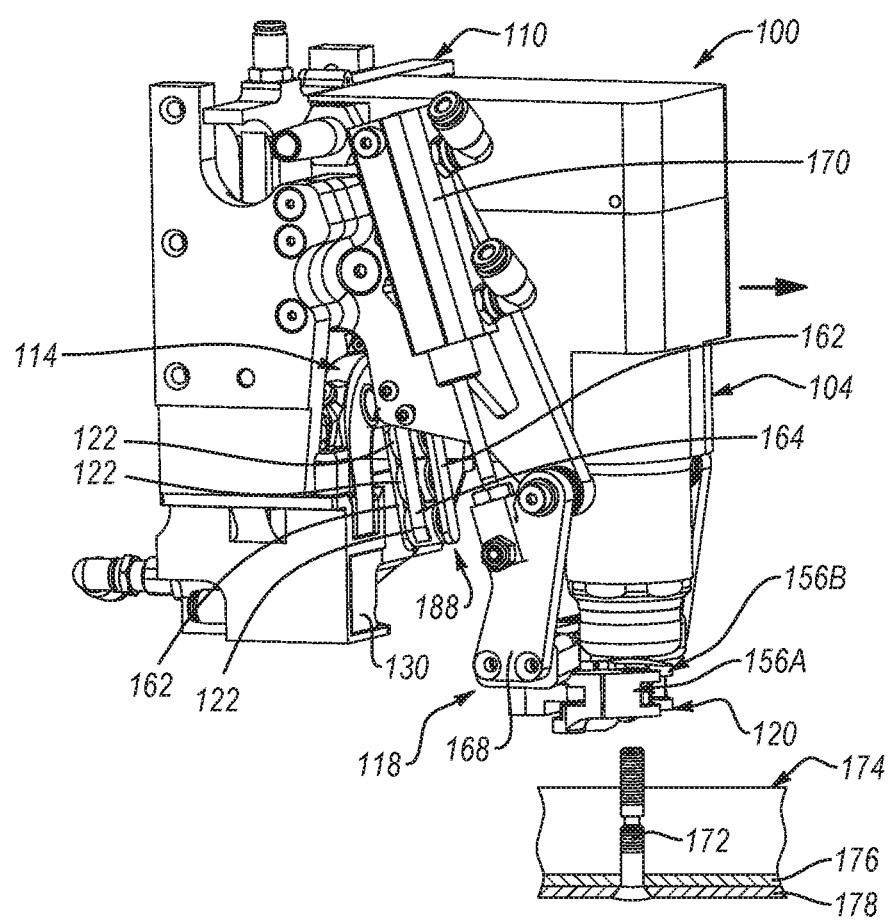
FIG. 21 is a schematic, perspective view of the end effector, an assembly fastener, and a part of FIGS. 1A, 1B, and 1C, according to one or more examples of the subject matter, disclosed herein.
Figure 22:
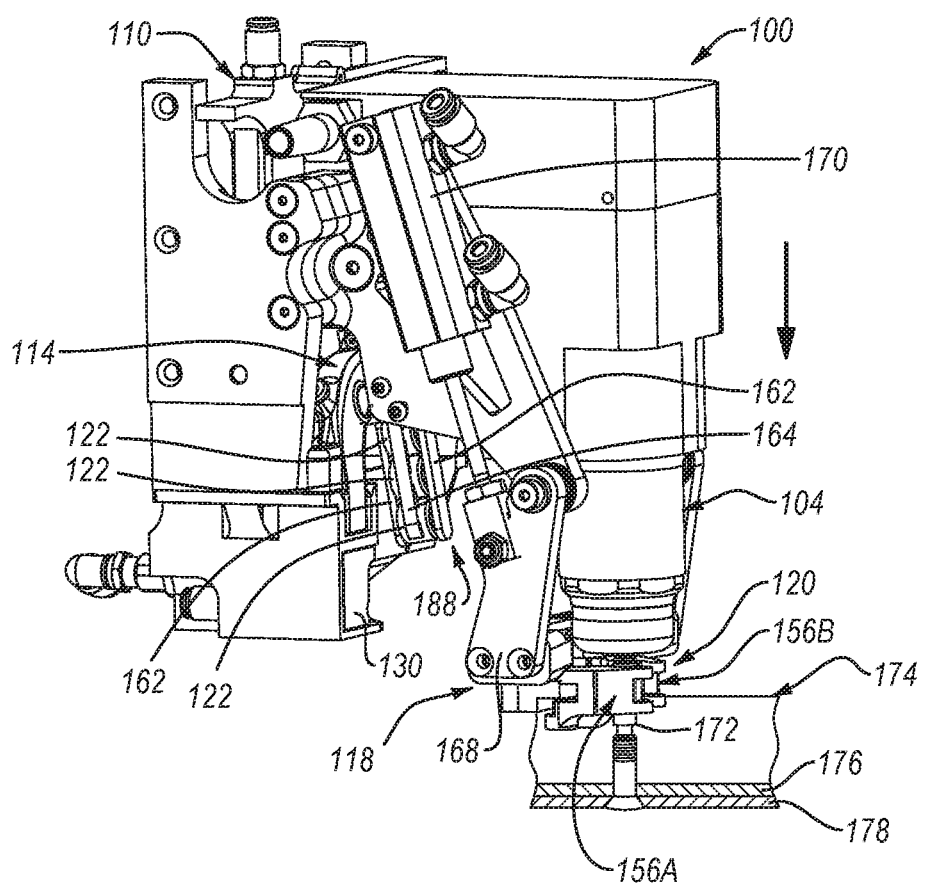
FIG. 22 is a schematic, perspective view of the end effector, the assembly fastener, and the part of FIGS. 1A, 1B, and 1C, according to one or more examples of the subject matter, disclosed herein.
Figure 23:
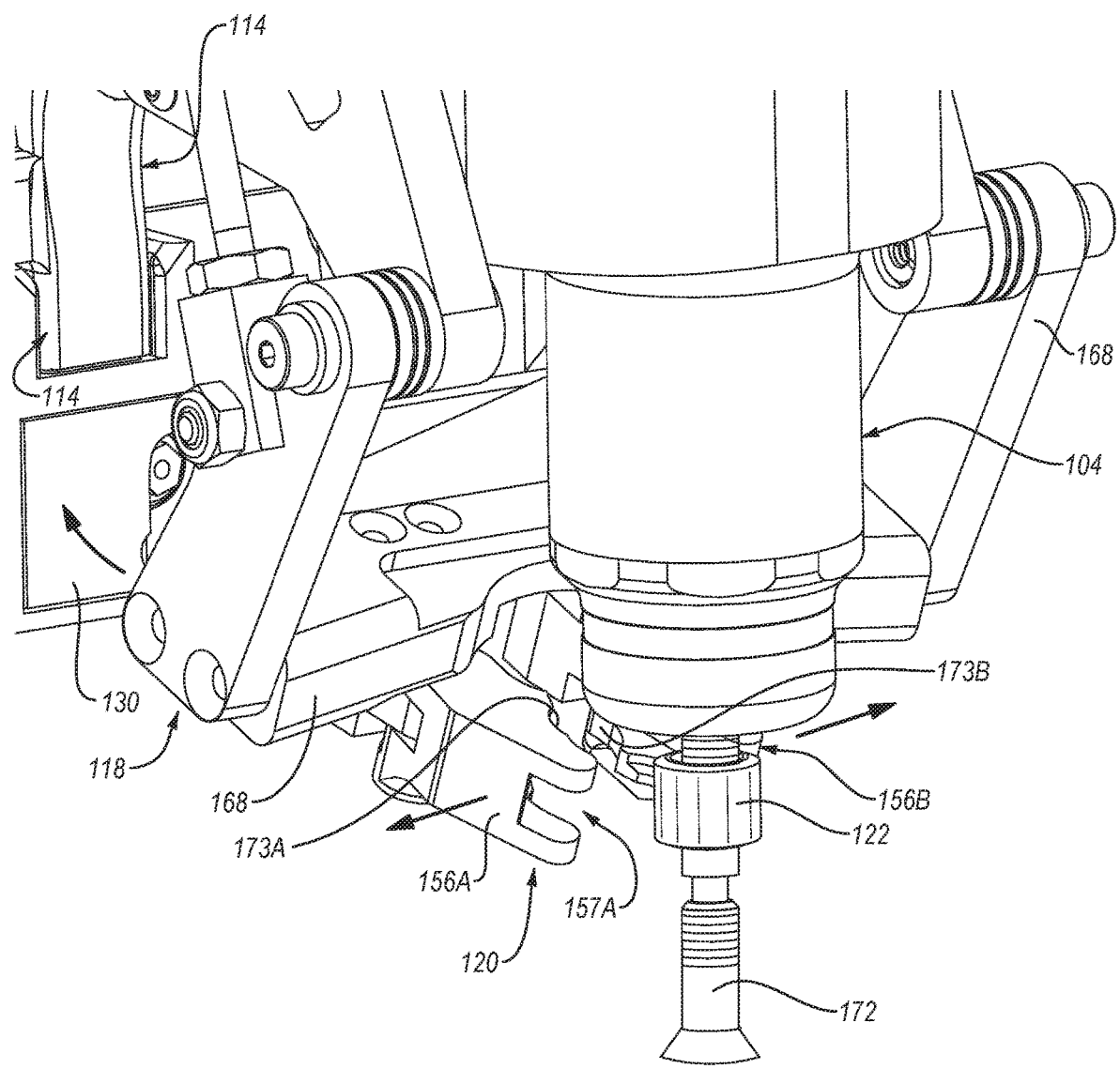
FIG. 23 is a schematic, perspective view of the end effector and the assembly fastener of FIGS. 1A, 1B, and 1C, according to one or more examples of the subject matter, disclosed herein.

Referring to FIGS. 21-23, according to one or more examples, a swaging operation includes positioning lock collar 122 on assembly fastener 172 such that assembly fastener 172 extends through lock collar 122. In some examples, assembly fastener 172 is a shear pull-type pin. Feeder 102 is configured to position lock collar 122 on assembly fastener 172 in front of swage gun 104. After lock collar 122 is positioned on assembly fastener 172, swage gun 104 forces lock collar 122 along assembly fastener 172 until pressed against first layer 176 and second layer 178 of part 174. When lock collar 122 is pressed against first layer 176 and second layer 178, a puller of swage gun 104 draws assembly fastener 172 into swage gun 104 while a swaging anvil of swage gun 104 presses down on and around assembly fastener 172. Swaging anvil of swage gun 104 compresses and deforms lock collar 122 into the grooves of assembly fastener 172. Further pulling of assembly fastener 172 into swage gun 104 elongates lock collar 122 and assembly fastener 172 to form a precise clamp between lock collar 122 and assembly fastener 172. Assembly fastener 172 is then released from swage gun 104 or portion of assembly fastener 172 draw into swage gun 104 is removed from rest of assembly fastener 172 to complete the swaging operation.

Actuator 132 is a pneumatically-powered actuator is some examples. In one or more examples, actuator 132 is an electronically-powered actuator, an electromagnetically-powered actuator, or another type of actuator.

Referring generally to FIGS. 1A, 1B, and 1C and particularly to, e.g., FIGS. 7-9 and 13 for illustrative purposes only and not by way of limitation, collar magazine 110 is further configured to selectively eject lock collar 122 with collar axis 180 perpendicular to swaging axis 186 of swage gun 104. Slot 136 is further configured to receive lock collar 122 from collar magazine 110 with collar axis 180 perpendicular to swaging axis 186. The preceding portion of this paragraph characterizes example two of the subject matter, disclosed herein, where example two also encompasses example one, above.

Collar magazine 110 and slot 136 enables movement of lock collar 122 from collar magazine 110 to slot 136 in a precise, efficient, and reliable manner, and in a manner that maintains collar axis 180 perpendicular to swaging axis 186. According to some examples, slot 136 has slot axis 184, which is collinear with collar axis 180 when lock collar 122 is in slot 136.

In some examples, after being ejected from collar magazine 110, lock collar 122 is gravity fed into slot 136.

Figure 13:
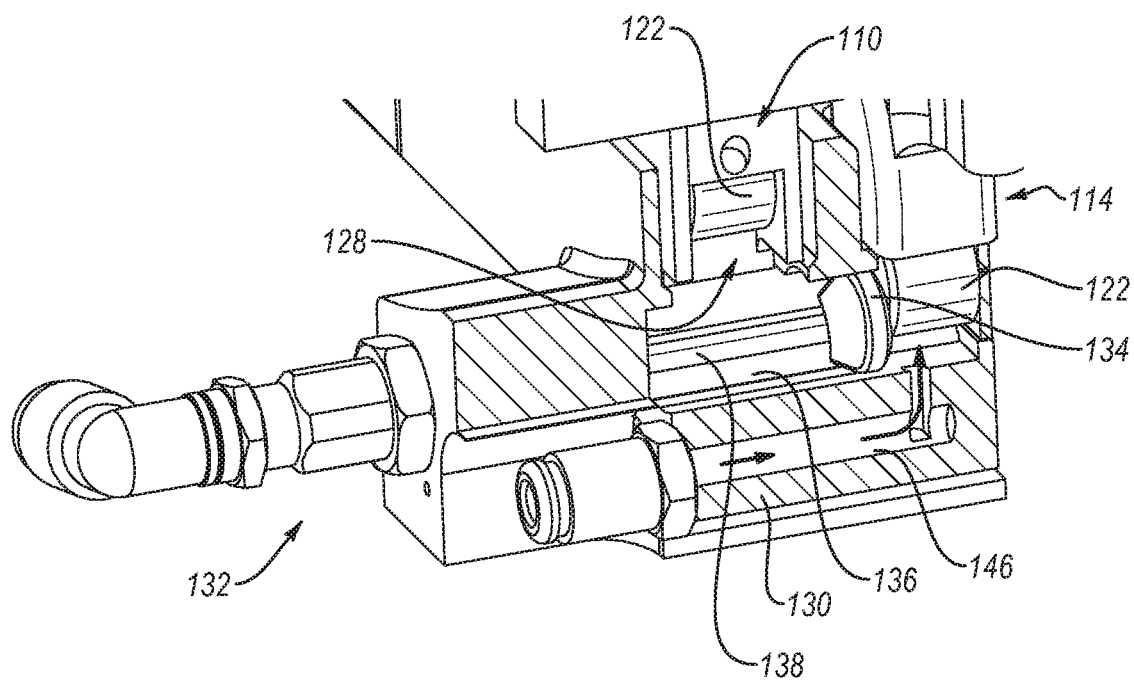
FIG. 13 is a schematic, perspective view of the collar magazine, the guide-block assembly, and the feed tunnel of the end effector of FIGS. 1A, 1B, and 1C, according to one or more examples of the subject matter, disclosed herein.

Referring generally to FIGS. 1A, 1B, and 1C and particularly to, e.g., FIG. 13 for illustrative purposes only and not by way of limitation, feeder 102 further comprises guide-block pneumatic source 145 that is configured to selectively generate a pneumatic pulse. Guide-block assembly 112 further comprises pneumatic passage 146, which is fluidically coupled with guide-block pneumatic source 145 and is in fluidic communication with slot 136 of guide block 130. The pneumatic pulse that is generated by guide-block pneumatic source 145 transfers lock collar 122 from slot 136 to feed tunnel 114. The preceding portion of this paragraph characterizes example three of the subject matter, disclosed herein, where example three also encompasses example two, above.

The pneumatic pulse from guide-block pneumatic source 145 enables movement of lock collar 122 from slot 136 of guide block 130 to feed tunnel 114 in a precise, efficient, and reliable manner.

In some examples, guide-block pneumatic source 145 comprises a pressurized gas that, when released, generates the pneumatic pulse. The pneumatic pulse travels from guide-block pneumatic source 145 along pneumatic passage 146 of guide-block assembly 112. Pneumatic passage 146 is open to slot 136 at a location, corresponding with second guide-block position B, such that the pneumatic pulse impacts lock collar 122, when in second guide-block position B, and forces lock collar 122 out of slot 136 and into feed tunnel 114.

Referring generally to FIGS. 1A, 1B, and 1C and particularly to, e.g., FIGS. 2, 4, and 8-14 for illustrative purposes only and not by way of limitation, guide-block pneumatic source 145 is further configured to selectively generate the pneumatic pulse when lock collar 122 is in second guide-block position B along slot 136 of guide block 130. Feed tunnel 114 receives lock collar 122 from guide block 130 with collar axis 180 perpendicular to swaging axis 186 when the pneumatic pulse that is generated by guide-block pneumatic source 145 transfers lock collar 122 from slot 136 to feed tunnel 114. The preceding portion of this paragraph characterizes example four of the subject matter, disclosed herein, where example four also encompasses example three, above.

Feed tunnel 114, receiving lock collar 122 from slot 136 of guide block 130, enables feeding of lock collar 122 away from guide block 130 in a manner that maintains lock collar 122 in orientation where collar axis 180 of lock collar 122 is perpendicular to swaging axis 186.

In some examples, the pneumatic pulse transfers lock collar 122 upward into feed tunnel 114.

Figure 14:
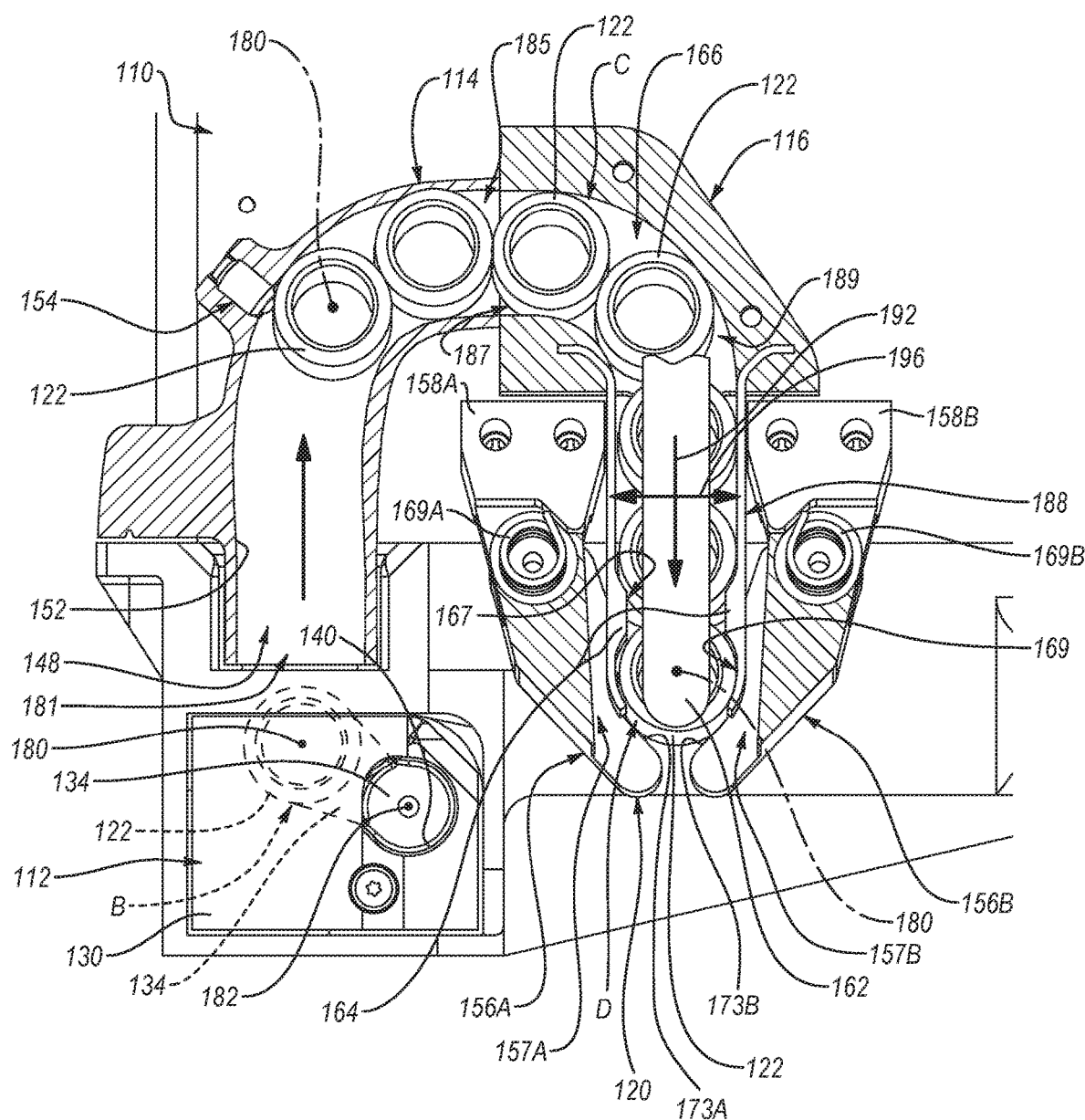
FIG. 14 is a schematic, elevation, sectional view of the collar magazine, the guide-block assembly, the feed tunnel, a dispensing bulkhead, and a gripper of the end effector of FIGS. 1A, 1B, and 1C, according to one or more examples of the subject matter, disclosed herein.
Figure 15:
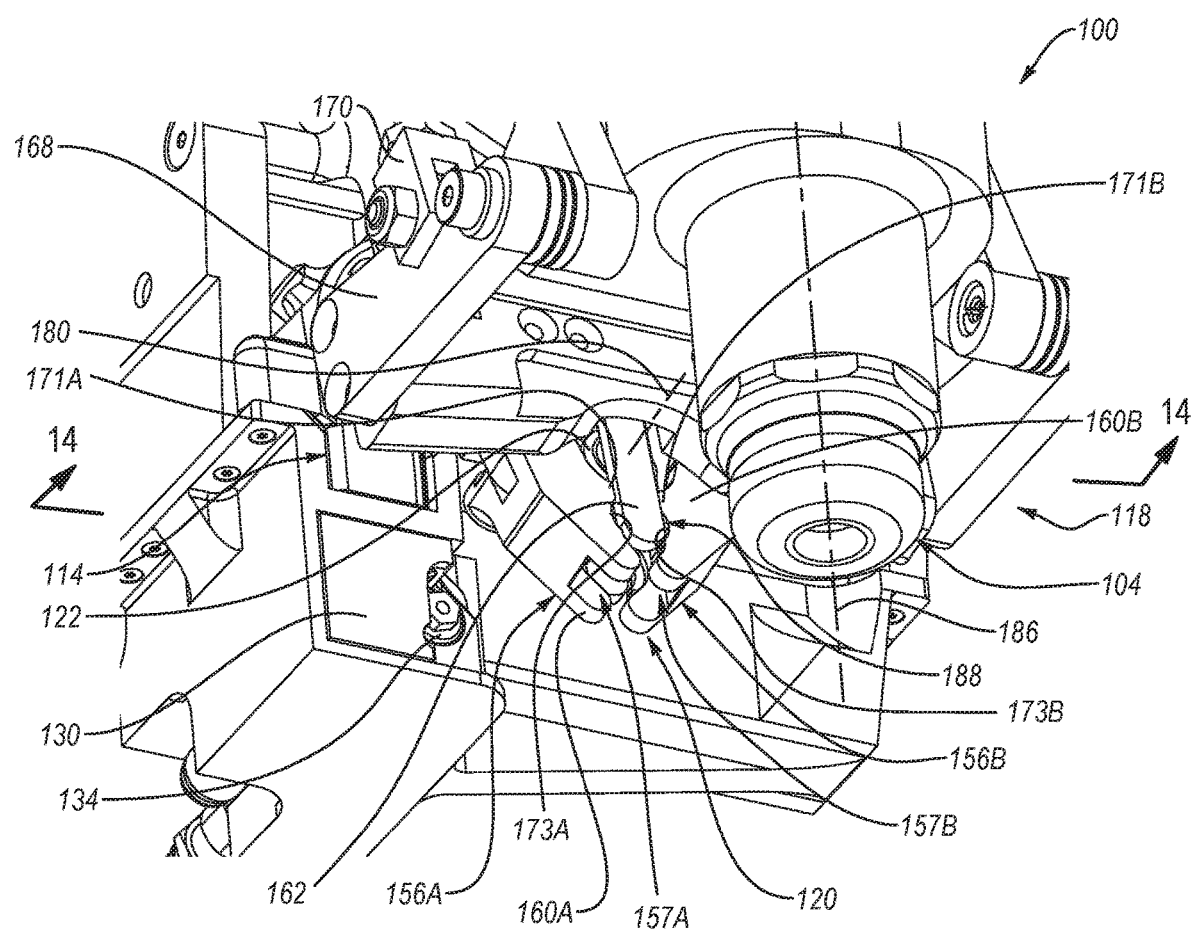
FIG. 15 is a schematic, perspective view of the end effector of FIGS. 1A, 1B, and 1C, according to one or more examples of the subject matter, disclosed herein.

Referring generally to FIGS. 1A, 1B, and 1C and particularly to, e.g., FIG. 14 for illustrative purposes only and not by way of limitation, dispensing bulkhead 116 is configured to receive lock collar 122 from feed tunnel 114 with collar axis 180 perpendicular to swaging axis 186. The preceding portion of this paragraph characterizes example five of the subject matter, disclosed herein, where example five also encompasses example four, above.

Dispensing bulkhead 116, receiving lock collar 122 from feed tunnel 114, enables feeding of lock collar 122 from feed tunnel 114 to dispensing bulkhead 116 in a manner that maintains lock collar 122 in orientation where collar axis 180 of lock collar 122 is perpendicular to swaging axis 186.

Referring generally to FIGS. 1A, 1B, and 1C and particularly to, e.g., FIGS. 14-18 for illustrative purposes only and not by way of limitation, lock collar 122 is movable along dispensing bulkhead 116 from first dispensing-bulkhead position C to second dispensing-bulkhead position D that is spaced away from first dispensing-bulkhead position C. The preceding portion of this paragraph characterizes example six of the subject matter, disclosed herein, where example six also encompasses example five, above.

Lock collar 122, being movable along dispensing bulkhead 116, enables lock collar 122 to be moved into a position, in which gripping assembly 118 can retrieve lock collar 122 in preparation for delivery to swage gun 104.

Referring generally to FIGS. 1A, 1B, and 1C and particularly to, e.g., FIG. 14 for illustrative purposes only and not by way of limitation, dispensing bulkhead 116 comprises dispensing channel 166, which has dispensing-channel inlet 187 and dispensing-channel outlet 189. Lock collar 122 is movable along dispensing channel 166 from dispensing-channel inlet 187 to dispensing-channel outlet 189. Feed tunnel 114 has feed-tunnel inlet 181 and feed-tunnel outlet 185. Lock collar 122 is movable along feed tunnel 114 from feed-tunnel inlet 181 to feed-tunnel outlet 185. Dispensing-channel inlet 187 is in communication with feed-tunnel outlet 185 to receive lock collar 122 from feed-tunnel outlet 185. The preceding portion of this paragraph characterizes example seven of the subject matter, disclosed herein, where example seven also encompasses example six, above.

Dispensing channel 166 of dispensing bulkhead 116 helps to move lock collar 122 away from feed tunnel to provide clearance for gripping assembly 118 to move into close proximity with dispensing bulkhead 116 for retrieving lock collar 122 from dispensing bulkhead 116.

In some examples, feed tunnel 114 and dispensing bulkhead 116 are separate parts and separately attached to each other. However, in one or more examples, feed tunnel 114 and dispensing bulkhead 116 are co-formed together and form a one-piece monolithic unitary construction.

Referring generally to FIGS. 1A, 1B, and 1C and particularly to, e.g., FIGS. 4 and 14-22 for illustrative purposes only and not by way of limitation, dispensing bulkhead 116 comprises retention assembly 188 that is configured to releasably retain lock collar 122 in second dispensing-bulkhead position D so that collar axis 180 of lock collar 122 is perpendicular to swaging axis 186. The preceding portion of this paragraph characterizes example eight of the subject matter, disclosed herein, where example eight also encompasses example seven, above.

Retention assembly 188 provides a mechanism that sufficiently secures lock collar 122 in anticipation of retrieval by gripping assembly 118, but also enables gripping assembly 118 to retrieve lock collar 122 when needed for deliver to swage gun 104.

Figure 16:
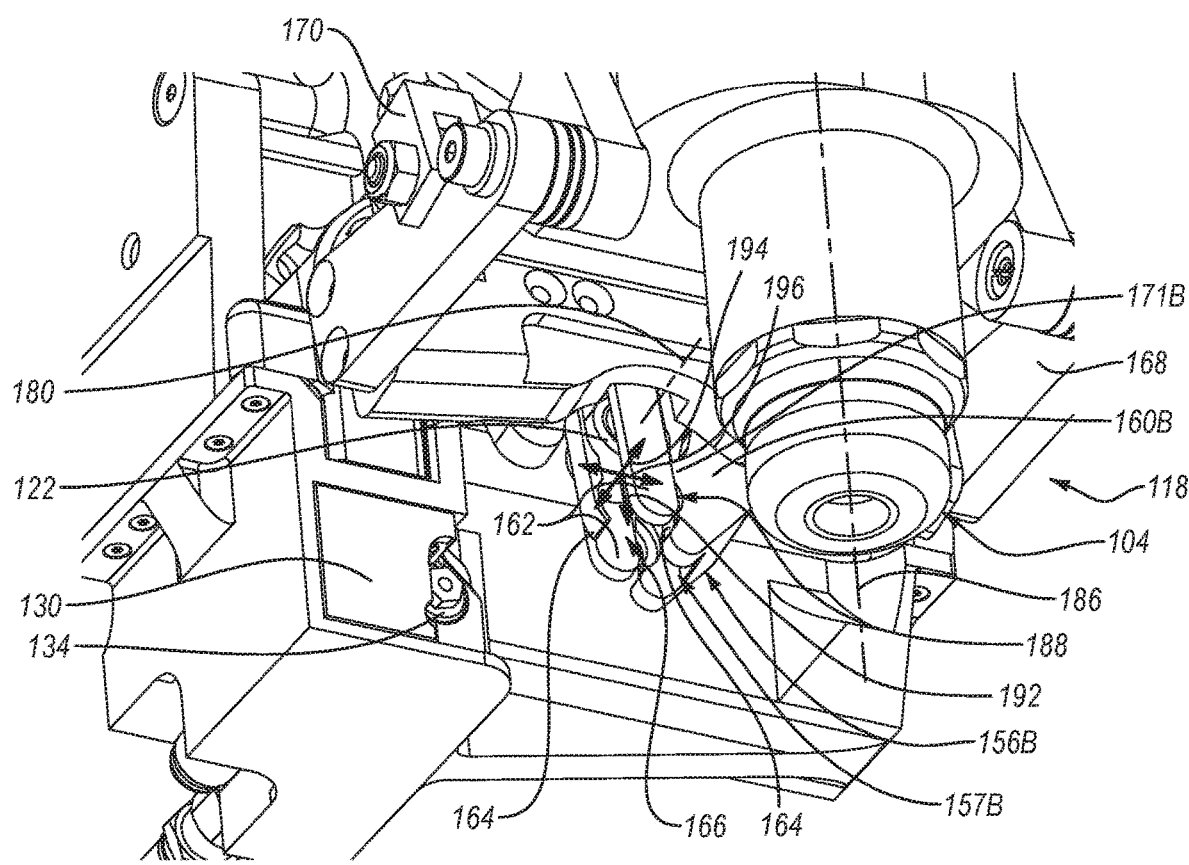
FIG. 16 is a schematic, perspective view of the end effector of FIGS. 1A, 1B, and 1C, according to one or more examples of the subject matter, disclosed herein.
Figure 17:
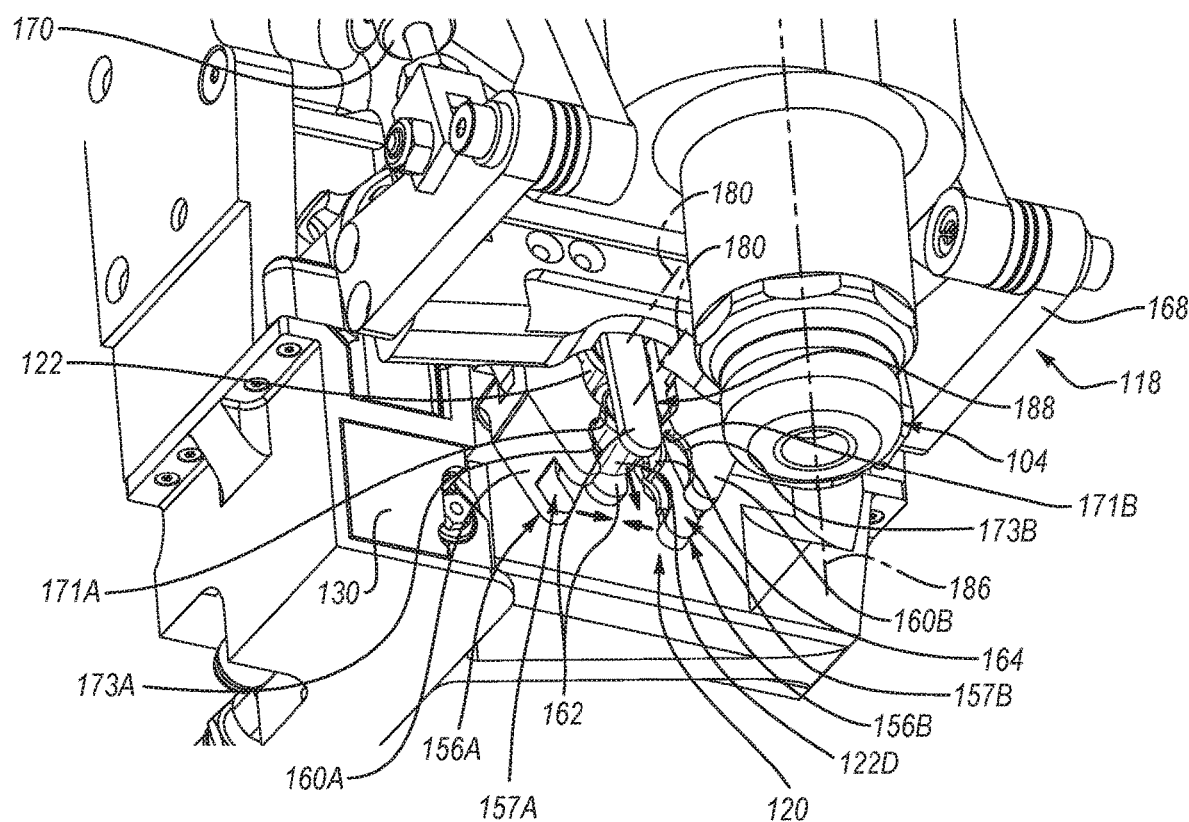
FIG. 17 is a schematic, perspective view of the end effector of FIGS. 1A, 1B, and 1C, according to one or more examples of the subject matter, disclosed herein.
Figure 18:
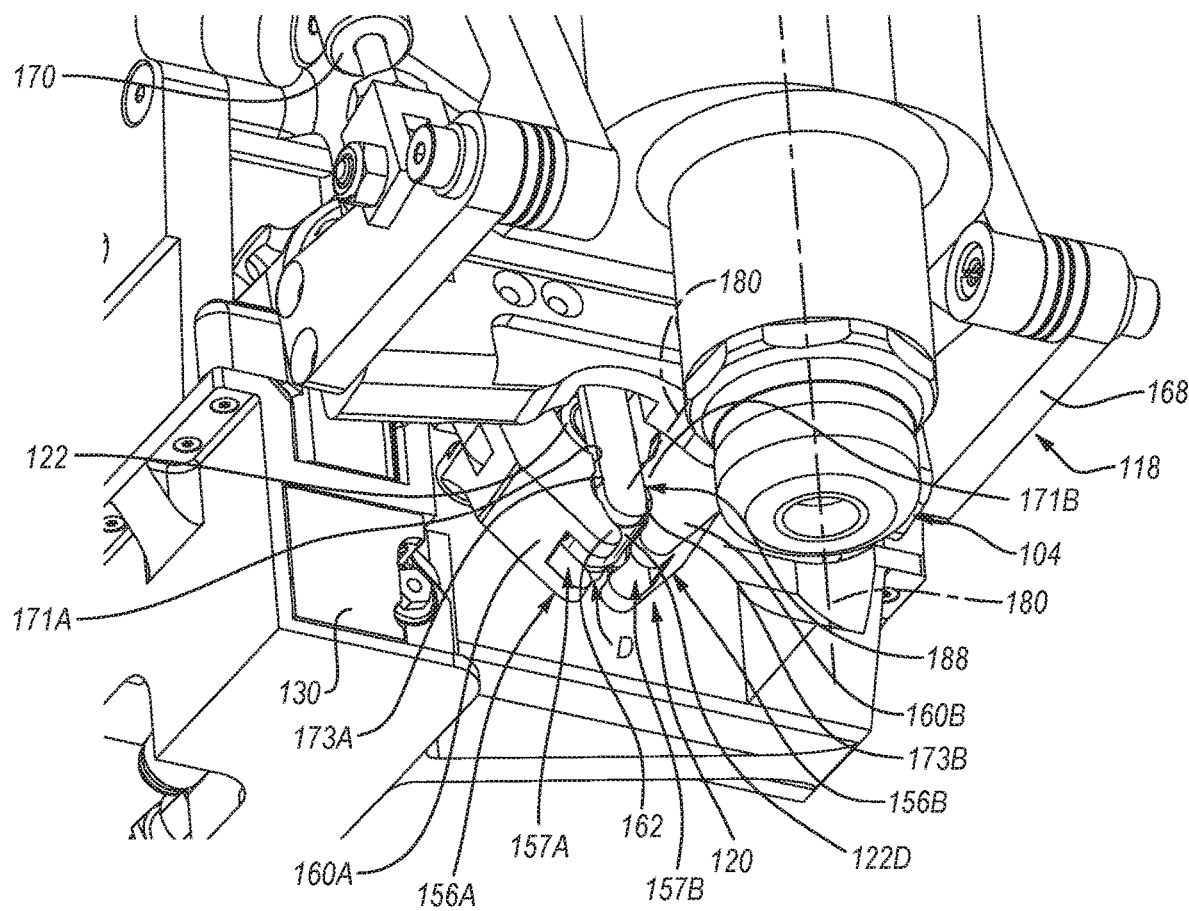
FIG. 18 is a schematic, perspective view of the end effector of FIGS. 1A, 1B, and 1C, according to one or more examples of the subject matter, disclosed herein.
Figure 19:
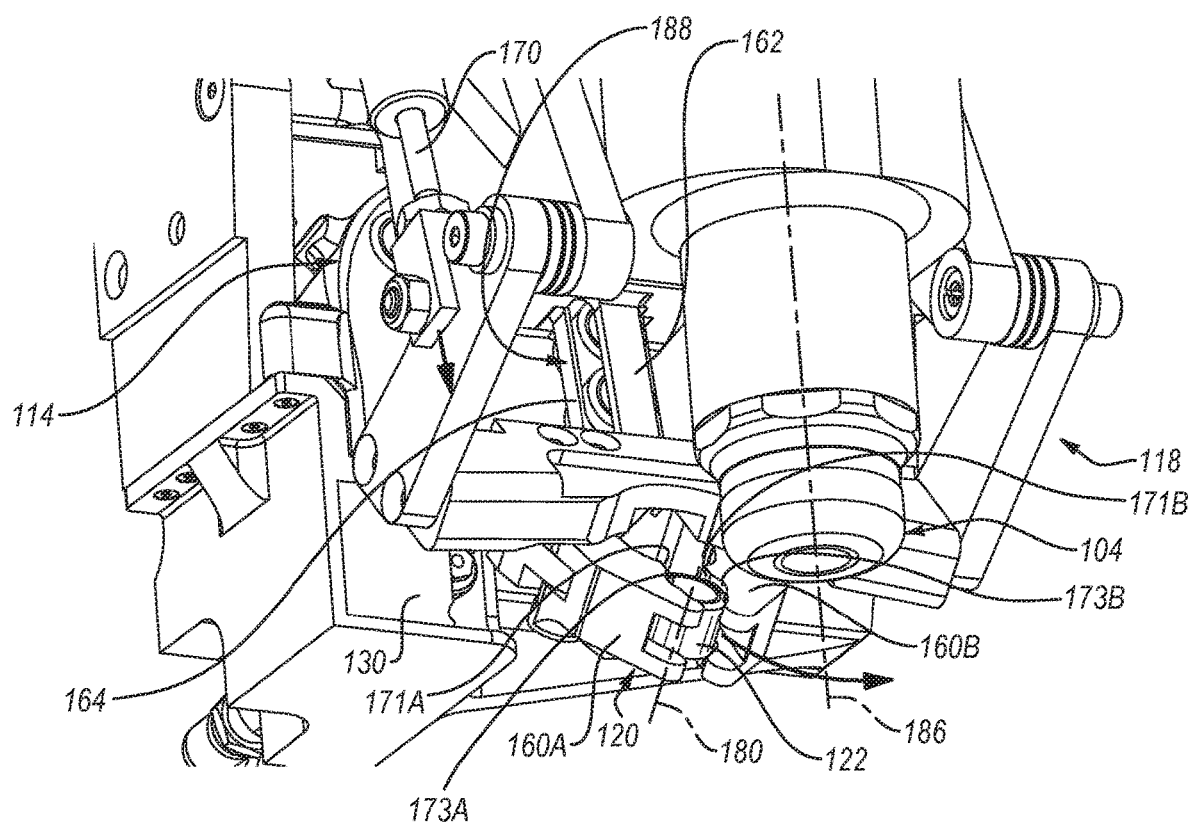
FIG. 19 is a schematic, perspective view of the end effector of FIGS. 1A, 1B, and 1C, according to one or more examples of the subject matter, disclosed herein.
Figure 20:
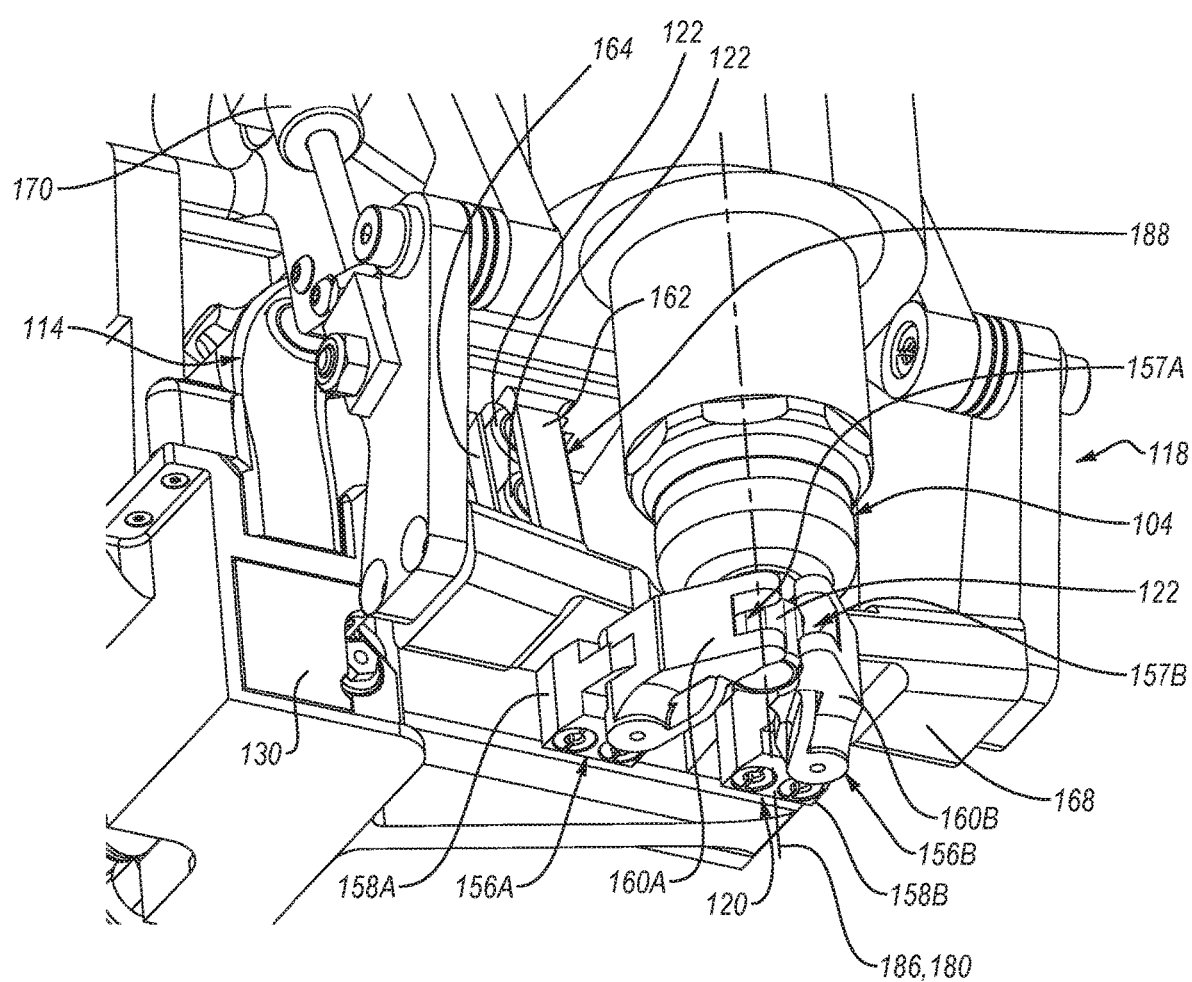
FIG. 20 is a schematic, perspective view of the end effector of FIGS. 1A, 1B, and 1C, according to one or more examples of the subject matter, disclosed herein.

Referring generally to FIGS. 1A, 1B, and 1C and particularly to, e.g., FIGS. 14 and 16 for illustrative purposes only and not by way of limitation, retention assembly 188 of dispensing bulkhead 116 is configured to receive lock collar 122 from dispensing-channel outlet 189. Lock collar 122 is movable along retention assembly 188 in a first direction. Retention assembly 188 is configured to prevent movement of lock collar 122 in second direction 194, which is perpendicular to first direction 192, and in third direction 196, which is perpendicular to first direction 192 and to second direction 194. The preceding portion of this paragraph characterizes example nine of the subject matter, disclosed herein, where example nine also encompasses example eight, above.

Constraining movement of lock collar 122 in second direction 194 and third direction 196 helps retain lock collar 122 in an orientation where collar axis 180 of lock collar 122 is perpendicular to swaging axis 186 as lock collar 122 moves along retention assembly 188 in first direction 192.

Referring generally to FIGS. 1A, 1B, and 1C and particularly to, e.g., FIGS. 14-22 for illustrative purposes only and not by way of limitation, retention assembly 188 comprises pair of first retention arms 162, spaced apart from each other and configured to prevent movement of lock collar 122 in second direction 194. Retention assembly 188 also comprises pair of second retention arms 164, spaced apart from each other and configured to prevent movement of lock collar 122 in third direction 196. The preceding portion of this paragraph characterizes example ten of the subject matter, disclosed herein, where example ten also encompasses example nine, above.

Pair of first retention arms 162 and pair of second retention arms 164 enable retention of lock collar 122 in a manner that enables gripping assembly 118 to grip lock collar 122 when releasably retained by retention assembly 188 of dispensing bulkhead 116.

Referring generally to FIGS. 1A, 1B, and 1C and particularly to, e.g., FIGS. 14-22 for illustrative purposes only and not by way of limitation, pair of second retention arms 164 is resiliently flexible. The preceding portion of this paragraph characterizes example eleven of the subject matter, disclosed herein, where example eleven also encompasses example ten, above.

The second retention arms of pair of second retention arms 164, being resiliently flexible, enable releasable retention of lock collar 122 in second dispensing-bulkhead position D and gripping assembly 118 to remove lock collar 122 from retention assembly 188 of dispensing bulkhead 116.

In some examples, pair of second retention arms 164 is more flexible than pair of first retention arms 162.

Referring generally to FIGS. 1A, 1B, and 1C and particularly to, e.g., FIGS. 14-19 for illustrative purposes only and not by way of limitation, pair of second retention arms 164 defines neck space 167 and receptacle space 169. Neck space 167 is between dispensing-channel outlet 189 and receptacle space 169. Neck space 167 is narrower than receptacle space 169. The preceding portion of this paragraph characterizes example twelve of the subject matter, disclosed herein, where example twelve also encompasses example eleven, above.

The second retention arms of pair of second retention arms 164, by defining neck space 167 and receptacle space 169, enable lock collar 122 to be separated from other lock collars in dispensing channel 166 and positioned in second dispensing-bulkhead position D for retrieval by gripping assembly 118 in a passive and controlled manner. In some examples, lock collar 122 is within receptacle space 169 when lock collar 122 is in second dispensing-bulkhead position D.

In some examples, as lock collar 122 is moved through neck space 167 toward second dispensing-bulkhead position D, the dimension of lock collar 122, being larger than that of neck space 167, enable lock collar 122 to push apart pair of second retention arms 164. Then, as lock collar 122 passes through neck space 167 and into receptacle space 169, the absence of lock collar 122 in neck space 167 and receptacle space 169 being wider than neck space 167 allows pair of second retention arms 164 to move back toward each other to retain lock collar 122 in receptacle space 169.

Referring generally to FIGS. 1A, 1B, and 1C and particularly to, e.g., FIGS. 14-19 for illustrative purposes only and not by way of limitation, portions of pair of second retention arms 164 that define receptacle space 169 are concave. The preceding portion of this paragraph characterizes example thirteen of the subject matter, disclosed herein, where example thirteen also encompasses example twelve, above.

The concave portions of pair of second retention arms 164 enable secure retention of lock collar 122 in second dispensing-bulkhead position D. In some examples, the concavity of pair of second retention arms 164 complements a circumference of lock collar 122 such that lock collar 122 is nestably engaged by the concave portions of pair of second retention arms 164 that define receptacle space 169.

Referring generally to FIGS. 1A, 1B, and 1C and particularly to, e.g., FIGS. 2, 4, 5, and 18-23 for illustrative purposes only and not by way of limitation, gripping assembly 118 comprises gripper 120. Gripping assembly 118 is pivotable, relative to dispensing bulkhead 116, to a collar-receiving position, in which gripper 120 is configured to receive lock collar 122, when lock collar 122 is in second dispensing-bulkhead position D, from retention assembly 188 of dispensing bulkhead 116, and to a collar-delivering position, in which lock collar 122 that is received by gripper 120 from retention assembly 188 is oriented so that collar axis 180 of lock collar 122 is parallel to swaging axis 186. The preceding portion of this paragraph characterizes example fourteen of the subject matter, disclosed herein, where example fourteen also encompasses any one of examples nine to thirteen, above.

Gripping assembly 118 provides for efficiently reorienting lock collar 122 from one orientation, conducive to storing and feeding multiple lock collars, to another orientation, conducive to a swaging operation by swage gun 104, in an angular sweeping motion.

As used herein, a first object, being pivotable relative to a second object, means the first object is pivotable non-contemporaneously with any pivoting of the second object and pivoting of both the first object and the second object cannot occur at the same time. In some examples, gripping assembly 118 comprises swing arm 168 and gripping-assembly actuator 170. Gripping-assembly actuator 170 is operable to pivot swing arm 168 relative to gripping assembly 118. Gripper 120 is attached to swing arm 168 such that when swing arm 168 is pivoted by gripping-assembly actuator 170, gripper 120 also pivots.

Referring generally to FIGS. 1A, 1B, and 1C and particularly to, e.g., FIGS. 14-23 for illustrative purposes only and not by way of limitation, gripper 120 comprises first gripper arm 156A and second gripper arm 156B. When lock collar 122 is releasably retained by retention assembly 188, first gripper arm 156A and second gripper arm 156B are movable toward each other to grasp lock collar 122 The preceding portion of this paragraph characterizes example fifteen of the subject matter, disclosed herein, where example fifteen also encompasses example fourteen, above.

First gripper arm 156A and second gripper arm 156B, being movable toward each other, enable secure retention of lock collar 122 by gripper 120, from retention assembly 188, without interfering with retention assembly 188.

In some examples, first gripper arm 156A and second gripper arm 156B are independently and passively movable relative to each other. In one or more examples, first gripper arm 156A and second gripper arm 156B are actively movable relative to each other, such as via an electric motor or actuator.

Referring generally to FIGS. 1A, 1B, and 1C and particularly to, e.g., FIGS. 14-23 for illustrative purposes only and not by way of limitation, first gripper arm 156A and second gripper arm 156B are biased toward each other. The preceding portion of this paragraph characterizes example sixteen of the subject matter, disclosed herein, where example sixteen also encompasses example fifteen, above.

First gripper arm 156A and second gripper arm 156B, being biased toward each other, promote quick and passively actuated releasable retention of lock collar 122.

According to some examples, first gripper arm 156A and second gripper arm 156B are biased toward each other using one of various biasing components, such as springs, actuators, weights, and the like.

Referring generally to FIGS. 1A, 1B, and 1C and particularly to, e.g., FIG. 14 for illustrative purposes only and not by way of limitation, gripping assembly 118 further comprises first spring 169A that is configured to bias first gripper arm 156A toward second gripper arm 156B. Gripping assembly 118 also comprises second spring 169B that is configured to bias second gripper arm 156B toward first gripper arm 156A. The preceding portion of this paragraph characterizes example seventeen of the subject matter, disclosed herein, where example seventeen also encompasses example sixteen, above.

First spring 169A and second spring 169B facilitate a simple and reliable way to bias first gripper arm 156A and second gripper arm 156B toward each other.

First spring 169A and second spring 169B are coil springs in some examples.

Referring generally to FIGS. 1A, 1B, and 1C and particularly to, e.g., FIG. 14 for illustrative purposes only and not by way of limitation, retention assembly 188 is configured to releasably retain lock collar 122 with a first biasing force. First spring 169A biases first gripper arm 156A toward second gripper arm 156B with a second biasing force. Second spring 169B biases second gripper arm 156B toward first gripper arm 156A with a third biasing force. Second biasing force and the third biasing force, in combination, are greater than the first biasing force. The preceding portion of this paragraph characterizes example eighteen of the subject matter, disclosed herein, where example eighteen also encompasses example seventeen, above.

The sum of the second biasing force and the third biasing force, being greater than the first biasing force, enables retention assembly 188 to sufficiently retain lock collar 122 in second dispensing-bulkhead position D when not acted upon by gripper 120 and to release lock collar 122 to gripper 120 when lock collar 122 in second dispensing-bulkhead position D is acted upon by gripper 120 as gripping assembly 118 pivots from collar-receiving position to collar-delivering position.

Referring generally to FIGS. 1A, 1B, and 1C and particularly to, e.g., FIGS. 14-20 for illustrative purposes only and not by way of limitation, retention assembly 188 comprises pair of first retention arms 162, configured to prevent movement of lock collar 122 in second direction 194. First gripper arm 156A comprises first retention-arm slot 157A that receives a first one of pair of first retention arms 162 when gripping assembly 118 is in the collar-receiving position. Second gripper arm 156B comprises second retention-arm slot 157B that receives a second one of pair of first retention arms 162 when gripping assembly 118 is in the collar-receiving position. The preceding portion of this paragraph characterizes example nineteen of the subject matter, disclosed herein, where example nineteen also encompasses any one of examples sixteen to eighteen, above.

First retention-arm slot 157A of first gripper arm 156A and second retention-arm slot 157B of second gripper arm 156B enables gripper 120 to move into position, relative to lock collar 122, and engage lock collar 122 without affecting retention of lock collar in second dispensing-bulkhead position D by pair of first retention arms 162. In some examples, first gripper arm 156A comprises first tapered portion 160A and second gripper arm 156B comprises second tapered portion 160B.

Referring generally to FIGS. 1A, 1B, and 1C and particularly to, e.g., FIGS. 14-20 for illustrative purposes only and not by way of limitation, first gripper arm 156A and second gripper arm 156B are biased toward each other. First gripper arm 156A comprises first neck projections 171A that straddle first retention-arm slot 157A. First gripper arm 156A also comprises first collar receptacles 173A that straddle first retention-arm slot 157A. Second gripper arm 156B comprises second neck projections 171B that straddle second retention-arm slot 157B. Second gripper arm 156B also comprises second collar receptacles 173B that straddle second retention-arm slot 157B. As gripping assembly 118 pivots from the collar-delivering position to the collar-receiving position: the first one of pair of first retention arms 162 is received in first retention-arm slot 157A of first gripper arm 156A; the second one of pair of first retention arms 162 is received in second retention-arm slot 157B of second gripper arm 156B; lock collar 122, when in second dispensing-bulkhead position D, engages first neck projections 171A of first gripper arm 156A and second neck projections 171B of second gripper arm 156B to move first gripper arm 156A and second gripper arm 156B away from each other; and after lock collar 122 in second dispensing-bulkhead position D engages first neck projections 171A of first gripper arm 156A and second neck projections 171B of second gripper arm 156B, first gripper arm 156A and second gripper arm 156B are urged toward each other to receive lock collar 122, in second dispensing-bulkhead position D, in first collar receptacles 173A of first gripper arm 156A and second collar receptacles 173B of second gripper arm 156B. The preceding portion of this paragraph characterizes example twenty of the subject matter, disclosed herein, where example twenty also encompasses example nineteen, above.

First neck projections 171A and second neck projections 171B of first gripper arm 156A and second gripper arm 156B, respectively, enable opening of gripper 120 to receive lock collar 122 as gripping assembly 118 pivots into collar-receiving position. First collar receptacle 173A and second collar receptacle 173B of first gripper arm 156A and second gripper arm 156B, respectively, enables secure retention of lock collar 122 by gripper 120.

Referring generally to FIGS. 1A, 1B, and 1C and particularly to, e.g., FIGS. 2, 3, 6, and 7 for illustrative purposes only and not by way of limitation, collar magazine 110 comprises collar-retention channel 124, configured to retain lock collar 122 so that collar axis 180 is perpendicular to swaging axis 186. The preceding portion of this paragraph characterizes example twenty-one of the subject matter, disclosed herein, where example twenty-one also encompasses any one of examples two to twenty, above.

Collar-retention channel 124 of collar magazine 110 enables feeder 102 to perform multiple swaging operations without having to replenish a supply of lock collars to feeder 102.

In some examples, collar-retention channel 124 is configured to retain a plurality of lock collars so that collar axis 180 of each one of the plurality of lock collars is perpendicular to swaging axis 186.

Figure 3:
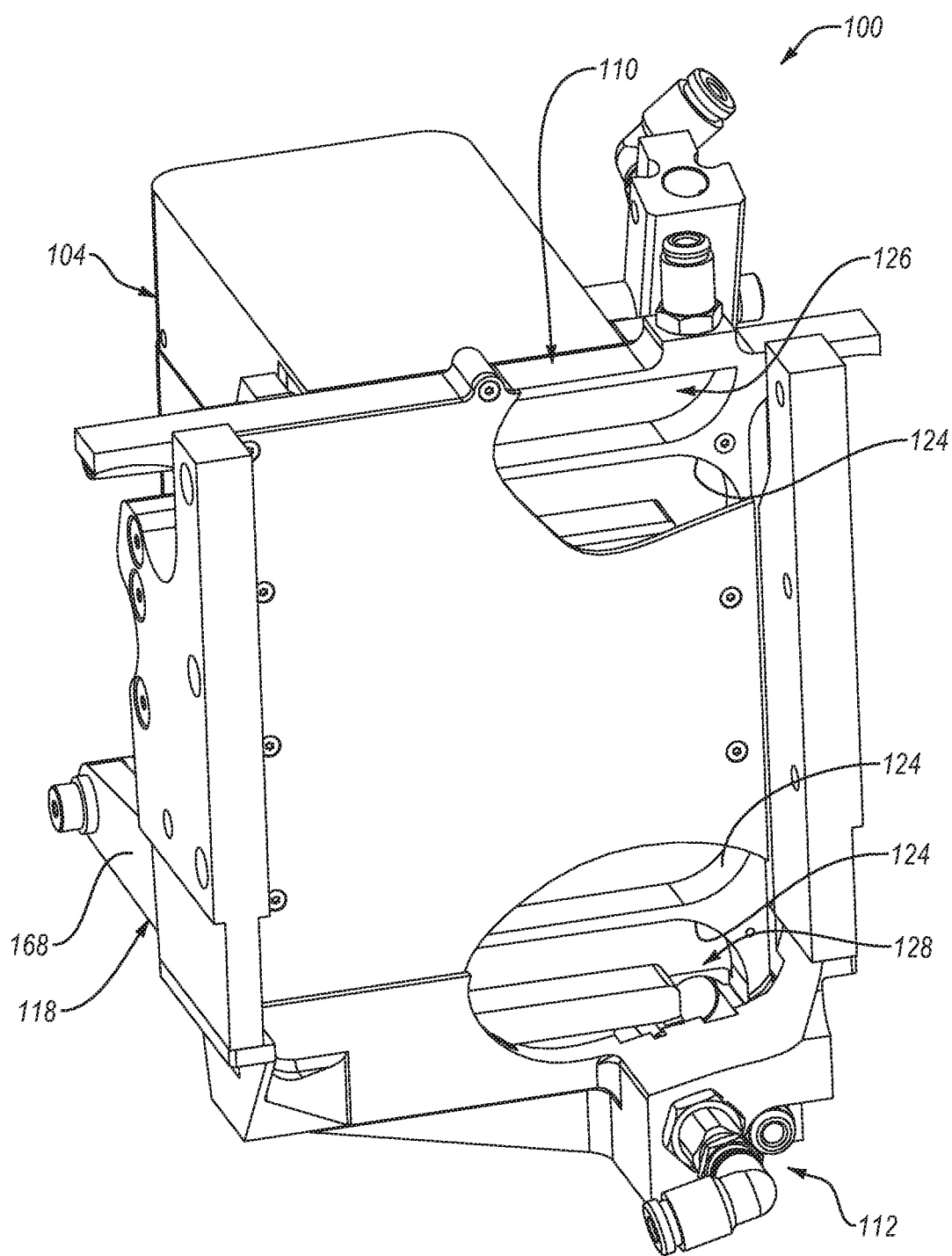
FIG. 3 is a schematic, perspective, partial cut-away view of the end effector of FIGS. 1A, 1B, and 1C, according to one or more examples of the subject matter, disclosed herein.
Figure 4:
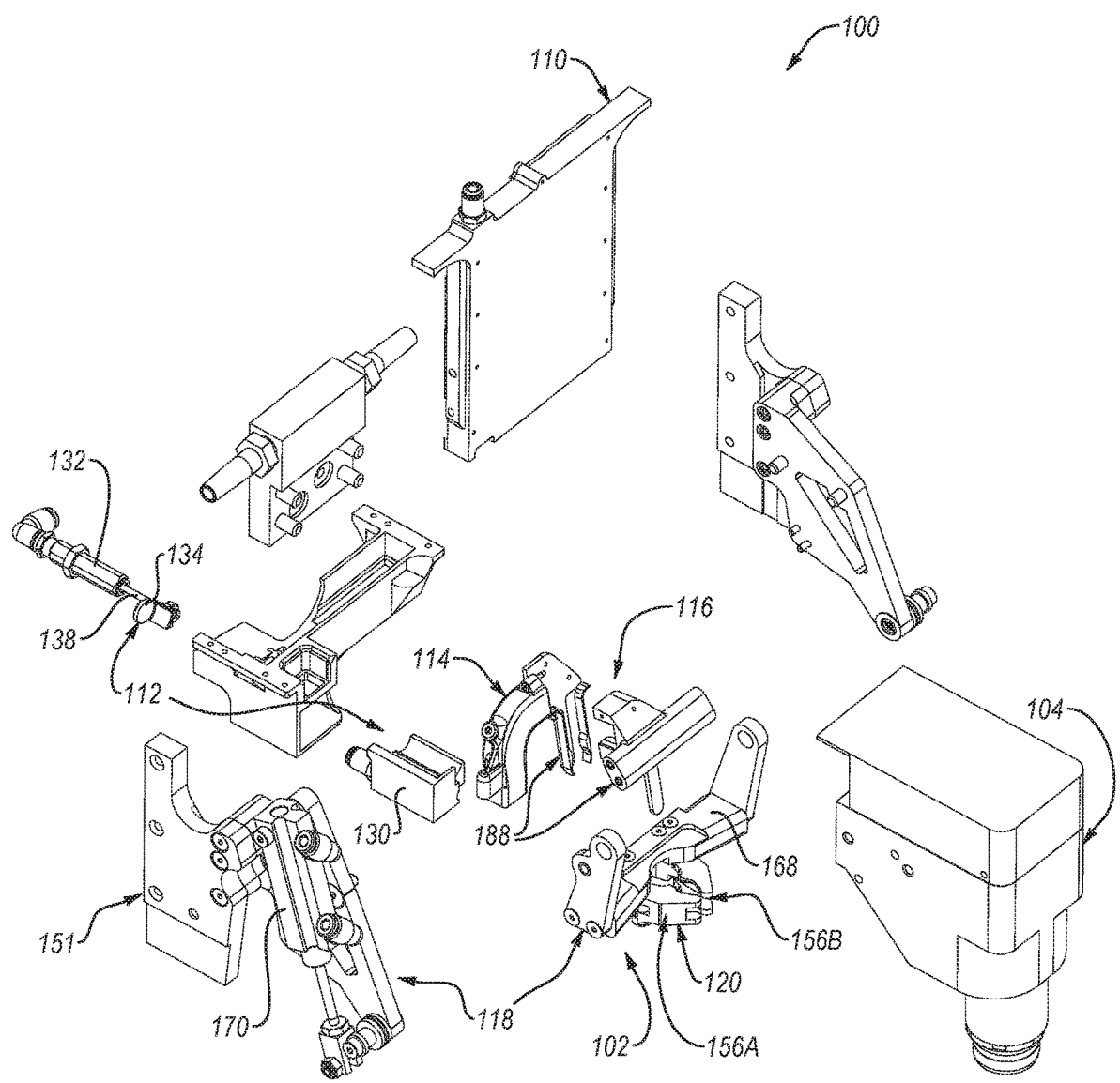
FIG. 4 is a schematic, perspective, exploded view of the end effector of FIGS. 1A, 1B, and 1C, according to one or more examples of the subject matter, disclosed herein.
Figure 6:
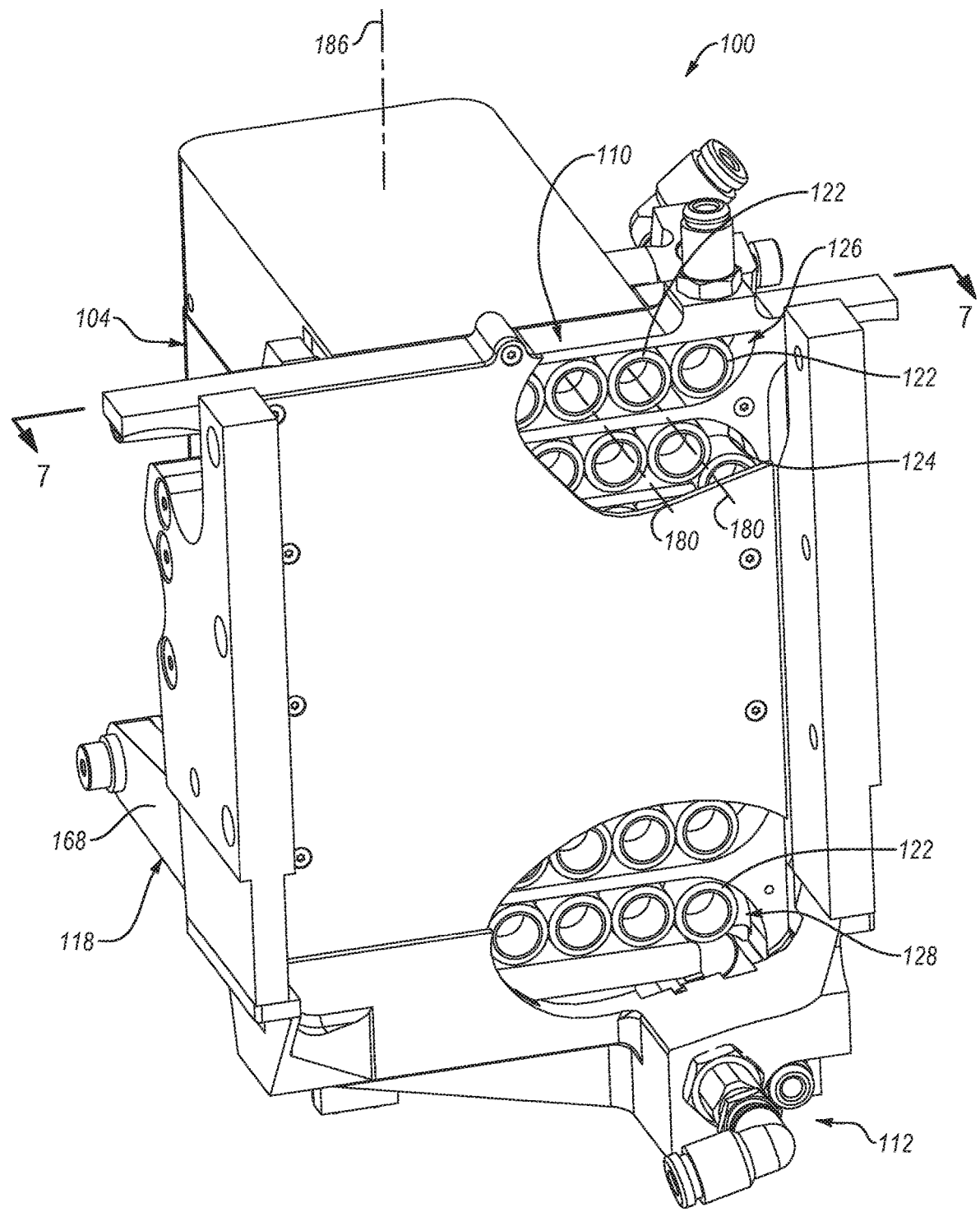
FIG. 6 is a schematic, perspective, partial cut-away view of the end effector of FIGS. 1A, 1B, and 1C, according to one or more examples of the subject matter, disclosed herein.
Figure 7:
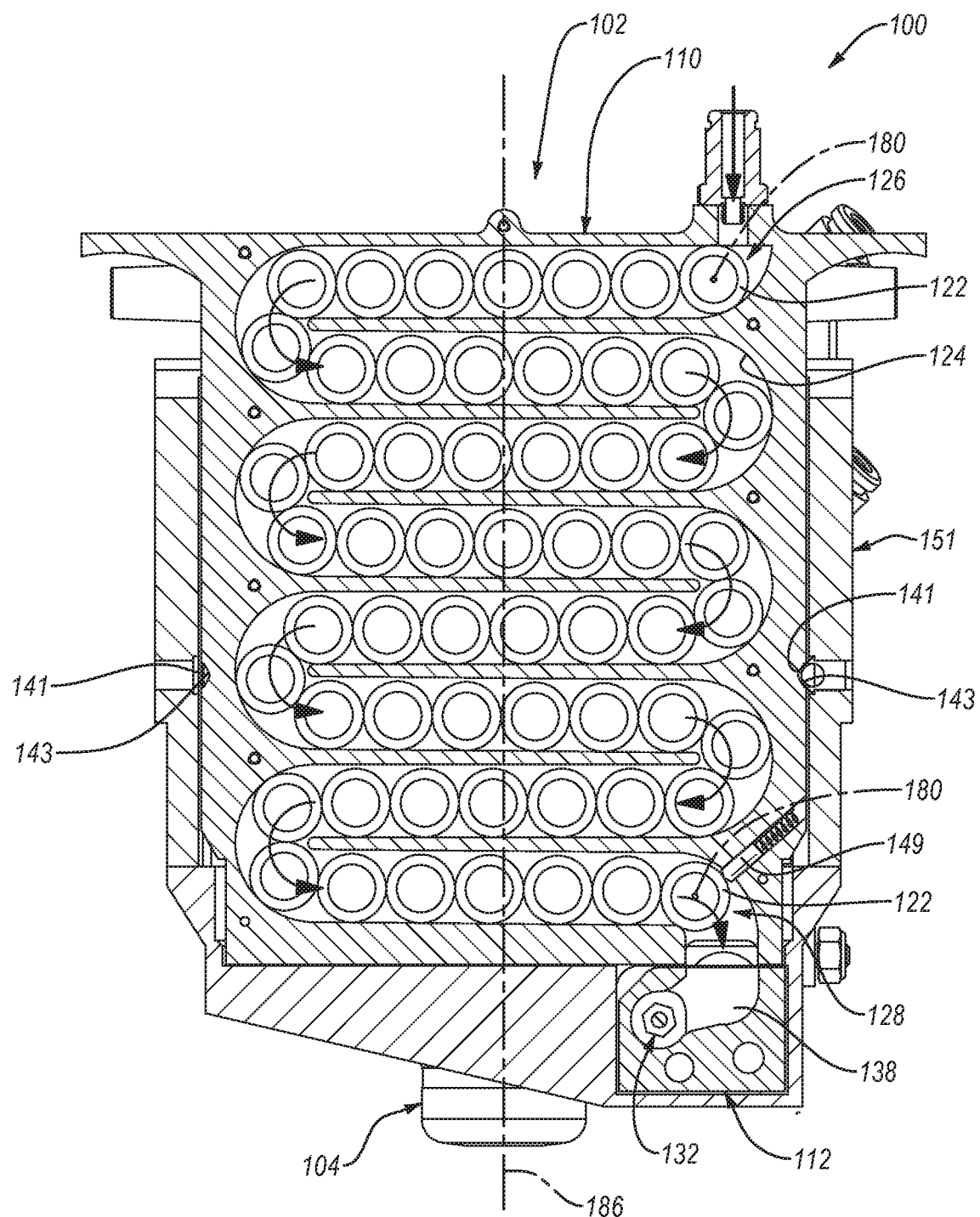
FIG. 7 is a schematic, elevation, sectional view of the end effector of FIGS. 1A, 1B, and 1C, according to one or more examples of the subject matter, disclosed herein.
Figure 8:
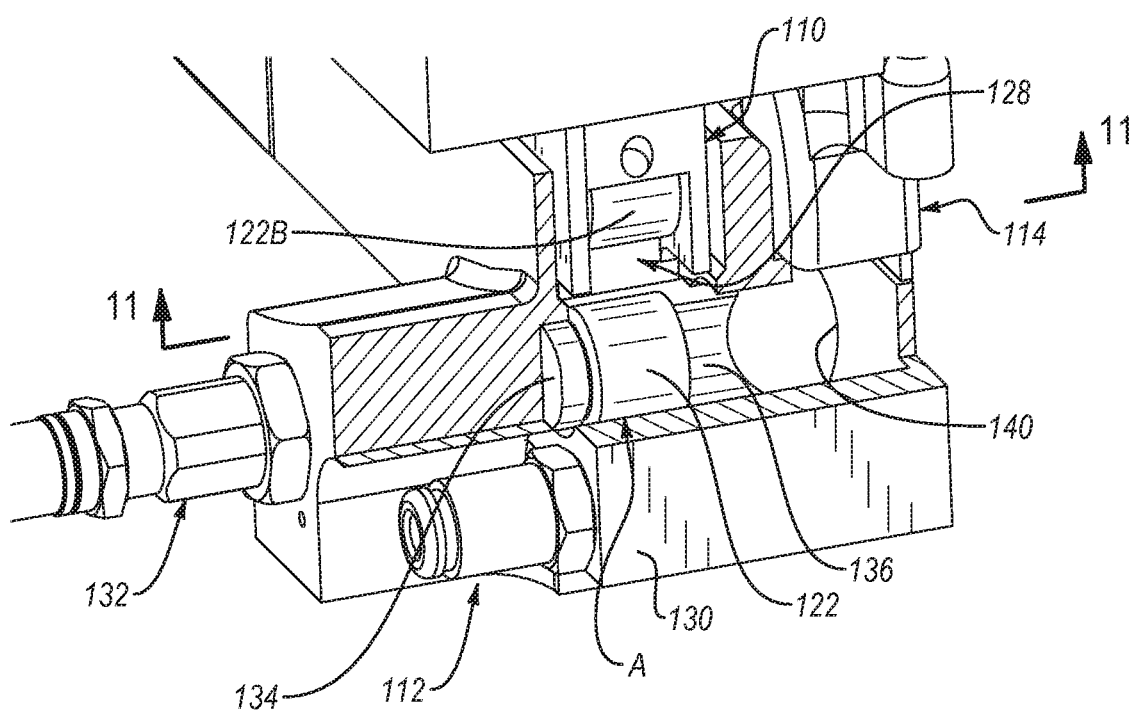
FIG. 8 is a schematic, perspective, sectional view of a collar magazine, a guide-block assembly, and a feed tunnel of the end effector of FIGS. 1A, 1B, and 1C, according to one or more examples of the subject matter, disclosed herein.

Referring generally to FIGS. 1A, 1B, and 1C and particularly to, e.g., FIGS. 3, 6, and 7 for illustrative purposes only and not by way of limitation, collar-retention channel 124 follows a serpentine path through collar magazine 110. The preceding portion of this paragraph characterizes example twenty-two of the subject matter, disclosed herein, where example twenty-two also encompasses example twenty-one, above.

Collar-retention channel 124, by following a serpentine path, which winds through collar magazine 110, helps to maximize capacity of collar magazine 110 to retain lock collars, which promotes a reduction in the frequency of replenishment of the supply of lock collars to feeder 102.

According to some examples, the serpentine path comprises a series of interconnected S-shaped paths.

Figure 9:
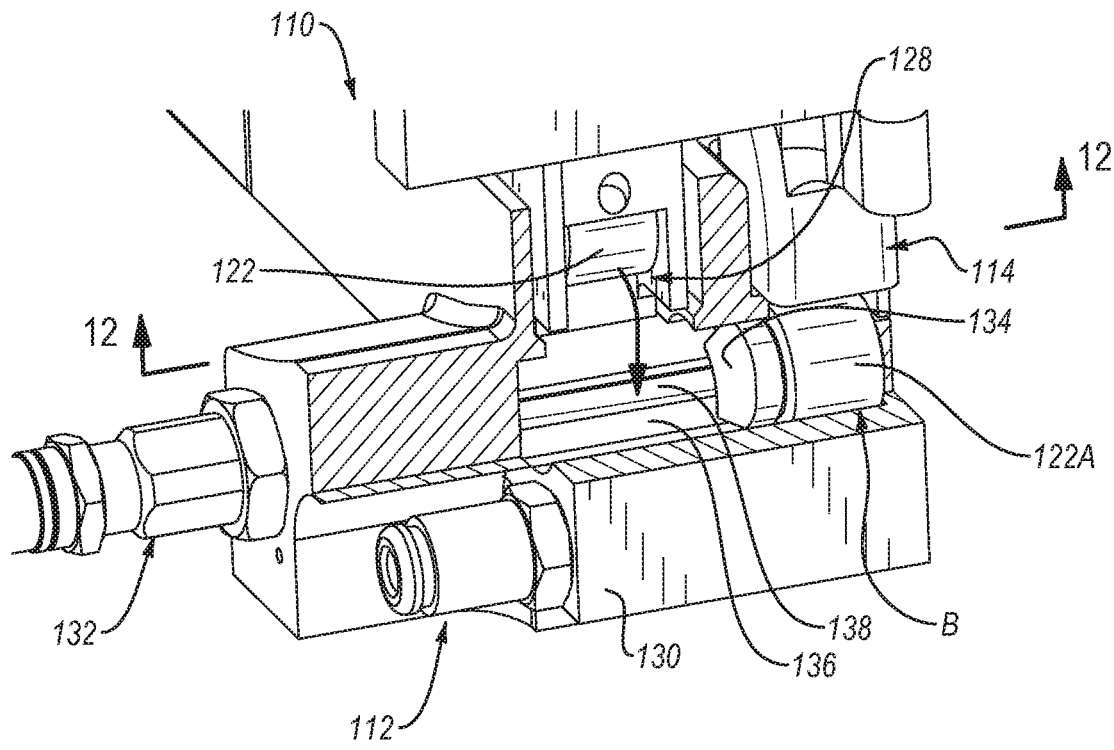
FIG. 9 is a schematic, perspective, sectional view of the collar magazine, the guide-block assembly, and the feed tunnel of the end effector of FIGS. 1A, 1B, and 1C, according to one or more examples of the subject matter, disclosed herein.
Figure 10:
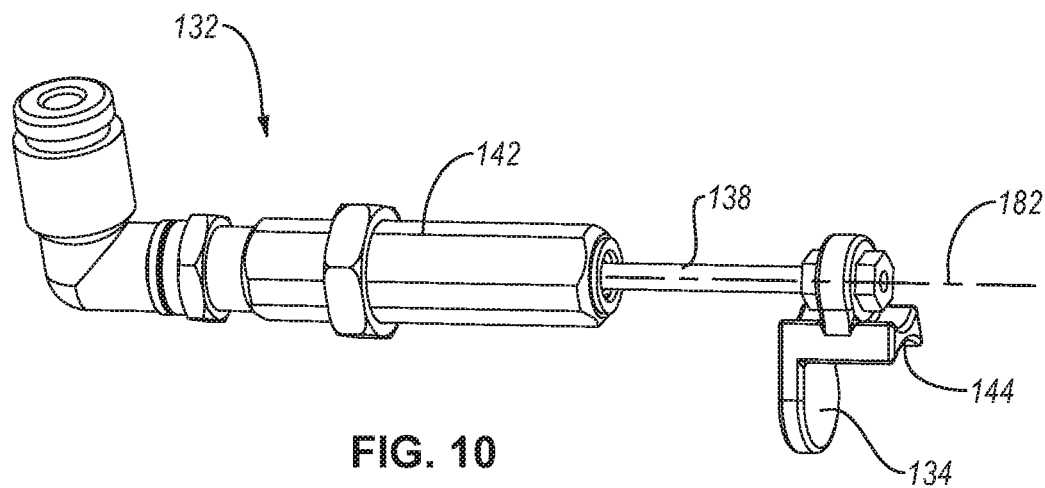
FIG. 10 is a schematic, perspective view of an actuator and a paddle of the guide-block assembly of FIGS. 8 and 9, according to one or more examples of the subject matter, disclosed herein.

Referring generally to FIGS. 1A, 1B, and 1C and particularly to, e.g., FIGS. 7 and 9 for illustrative purposes only and not by way of limitation, feeder 102 further comprises collar-magazine pneumatic source 159 that is configured to selectively generate a pneumatic pulse. Collar-retention channel 124 of collar magazine 110 comprises channel inlet 126 and channel outlet 128. Channel inlet 126 is fluidically coupled with collar-magazine pneumatic source 159. Slot 136 of guide block 130 is configured to receive lock collar 122 from channel outlet 128 of collar-retention channel 124. When channel inlet 126 of collar-retention channel 124 receives the pneumatic pulse that is selectively generated by collar-magazine pneumatic source 159, collar magazine 110 ejects lock collar 122 from channel outlet 128 into slot 136 of guide block 130. The preceding portion of this paragraph characterizes example twenty-three of the subject matter, disclosed herein, where example twenty-three also encompasses example twenty-one or twenty-two, above.

The pneumatic pulse from collar-magazine pneumatic source 159 enables movement of lock collar 122 from channel inlet 126 to channel outlet 128 and facilitates ejection of lock collar 122 from channel outlet 128 in a precise, efficient, and reliable manner.

Referring generally to FIGS. 1A, 1B, and 1C and particularly to, e.g., FIGS. 7-14 for illustrative purposes only and not by way of limitation, guide-block assembly 112 further comprises paddle 134 that is coupled to actuator 132. Paddle 134 is movable along slot 136 of guide block 130 by actuator 132 to push lock collar 122 from first guide-block position A to second guide-block position B. The preceding portion of this paragraph characterizes example twenty-four of the subject matter, disclosed herein, where example twenty-four also encompasses any one of examples one to twenty-three, above.

Paddle 134 makes it possible to move lock collar 122 along slot 136 of guide block 130 in an efficient manner. In some examples, paddle 134 comprises contoured surface 144 that complements an outer surface of lock collar 122.

Referring generally to FIGS. 1A, 1B, and 1C and particularly to, e.g., FIGS. 7-14 for illustrative purposes only and not by way of limitation, actuator 132 defines working axis 182 and comprises linear rod 138 that is coaxial with and movable along working axis 182. Paddle 134 is coupled with linear rod 138. Collar axis 180 is offset from working axis 182 of actuator 132 when lock collar 122 is in slot 136. The preceding portion of this paragraph characterizes example twenty-five of the subject matter, disclosed herein, where example twenty-five also encompasses example twenty-four, above.

Paddle 134, extending from working axis 182 to collar axis 180 of lock collar 122, and working axis 182 being offset relative to collar axis 180 of lock collar 122, when lock collar 122 is in slot 136, facilitates convenient assembly of actuator 132 and guide block 130.

Referring generally to FIGS. 1A, 1B, and 1C and particularly to, e.g., FIGS. 8, 10-12, and 14 for illustrative purposes only and not by way of limitation, guide block 130 further comprises actuator-assembly opening 140 that has central axis 183 that is collinear with working axis 182 of actuator 132. The preceding portion of this paragraph characterizes example twenty-six of the subject matter, disclosed herein, where example twenty-six also encompasses example twenty-five, above.

Actuator-assembly opening 140 provides access through which paddle 134 can be fixed to linear rod 138 after paddle 134 is positioned within slot 136 during an assembly operation of guide-block assembly 112.

Referring generally to FIGS. 1A, 1B, and 1C and particularly to, e.g., FIG. 14 for illustrative purposes only and not by way of limitation, feed tunnel 114 comprises spring-loaded retainer 154 that is configured to prevent lock collar 122 from passing from feed tunnel 114 to guide-block assembly 112. The preceding portion of this paragraph characterizes example twenty-seven of the subject matter, disclosed herein, where example twenty-seven also encompasses any one of examples one to twenty-six, above.

Spring-loaded retainer 154 helps to reduce the number of lock collars that need to be in dispensing bulkhead 116 for feeder 102 to operate, which promotes a reduction in material waste.

In certain examples, spring-loaded retainer 154 comprises a plunger and a spring that biases the plunger into tunnel path 152 of feed tunnel 114 at a location, intermediate feed-tunnel inlet 181 and feed-tunnel outlet 185. The plunger extends sufficiently into tunnel path 152 to contact and impede exiting of lock collar 122 from feed tunnel 114 back to guide-block assembly 112. In other words, spring-loaded retainer 154 ensures lock collars in feed tunnel 114 and dispensing bulkhead 116 remain in feed tunnel 114 and dispensing bulkhead 116 once received from guide-block assembly 112. The pneumatic pulse from guide-block pneumatic source 145 applies a force to lock collar 122 in guide-block assembly 112, sufficient to urge lock collar 122 into feed tunnel 114, along tunnel path 152, and past spring-loaded retainer 154 by overcoming the biasing force of spring-loaded retainer 154. Once past spring-loaded retainer 154, lock collar 122 is prevented by spring-loaded retainer 154 from falling back into guide-block assembly 112.

Referring generally to FIGS. 1A, 1B, and 1C and particularly to, e.g., FIG. 14 for illustrative purposes only and not by way of limitation, feed tunnel 114 and dispensing bulkhead 116 collectively define lock-collar path 148, which has an arcuate shape. The preceding portion of this paragraph characterizes example twenty-eight of the subject matter, disclosed herein, where example twenty-eight also encompasses any one of examples one to twenty-seven, above.

Lock-collar path 148, having an arcuate shape, provides clearance for gripper 120 to move into close proximity with dispensing bulkhead 116 for retrieving lock collar 122 from dispensing bulkhead 116.

Figure 5:
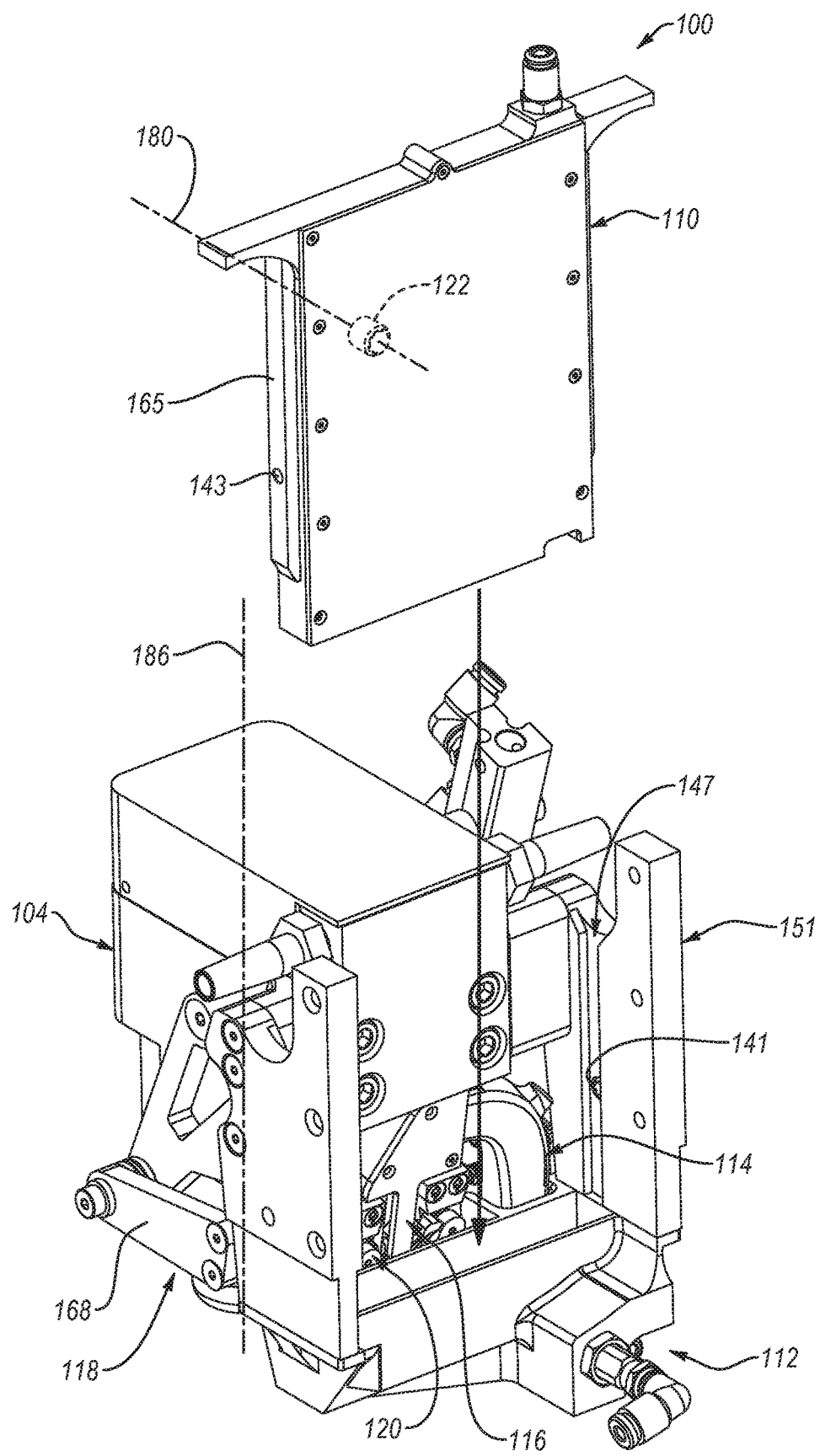
FIG. 5 is a schematic, perspective, partial exploded view of the end effector of FIGS. 1A, 1B, and 1C, according to one or more examples of the subject matter, disclosed herein.

Referring generally to FIGS. 1A, 1B, and 1C and particularly to, e.g., FIG. 5 for illustrative purposes only and not by way of limitation, feeder 102 further comprises body 151 with which collar magazine 110, guide-block assembly 112, feed tunnel 114, dispensing bulkhead 116, and gripping assembly 118 are coupled. Body 151 comprises linear channel 147. Collar magazine 110 comprises linear tab 165. Linear channel 147 receives linear tab 165 to couple collar magazine 110 to body 151. The preceding portion of this paragraph characterizes example twenty-nine of the subject matter, disclosed herein, where example twenty-nine also encompasses any one of examples one to twenty-eight, above.

Linear channel 147 helps to guide linear tab 165 of collar magazine 110 into engagement with body 151.

Referring generally to FIGS. 1A, 1B, and 1C and particularly to, e.g., FIGS. 5 and 7 for illustrative purposes only and not by way of limitation, body 151 further comprises spring-loaded body plunger 141. Collar magazine 110 further comprises dimple 143. Dimple 143 is releasably engageable with spring-loaded body plunger 141 to prevent movement of collar magazine 110 relative to body 151. The preceding portion of this paragraph characterizes example thirty of the subject matter, disclosed herein, where example thirty also encompasses example twenty-nine, above.

Spring-loaded body plunger 141 provides a mechanism that keeps collar magazine 110 engaged with body 151 unless a force, overcoming the biasing force of spring-loaded body plunger 141, is applied to collar magazine 110 to remove collar magazine 110 from body 151.

In certain examples, spring-loaded body plunger 141 comprises a plunger and a spring that biases the plunger into engagement with dimple 142 when collar magazine 110 is mated with body 151.

Referring generally to FIGS. 1A, 1B, and 1C and particularly to, e.g., FIG. 7 for illustrative purposes only and not by way of limitation, collar magazine 110 comprises spring-loaded magazine plunger 149 that releasably retains lock collar 122 in collar magazine 110. The preceding portion of this paragraph characterizes example thirty-one of the subject matter, disclosed herein, where example thirty-one also encompasses any one of examples one to thirty, above.

Spring-loaded magazine plunger 149 provides a mechanism that keeps lock collars in collar magazine 110 unless lock collars in collar magazine 110 receive a pneumatic pulse from collar-magazine pneumatic source 159.

In certain examples, spring-loaded magazine plunger 149 comprises a plunger and a spring that biases the plunger into collar-retention channel 124 of collar magazine 110 at channel outlet 128. The plunger extends sufficiently into collar-retention channel 124 to contact and impede exiting of lock collar 122 from channel outlet 128 of collar-retention channel 124. The pneumatic pulse from collar-magazine pneumatic source 159 applies a force to lock collars in collar-retention channel 124 that is sufficient to overcome the biasing force of the spring of spring-loaded magazine plunger 149. Accordingly, when pneumatic pulse is applied to lock collars in collar-retention channel 124, the force is transmitted from lock collar to lock collar until lock collar 122 stopped by plunger applies the force to the plunger, which overcomes the biasing force of the spring, and causes the plunger to retract, thus enabling lock collar 122 to exit collar magazine 110.

Figure 11:
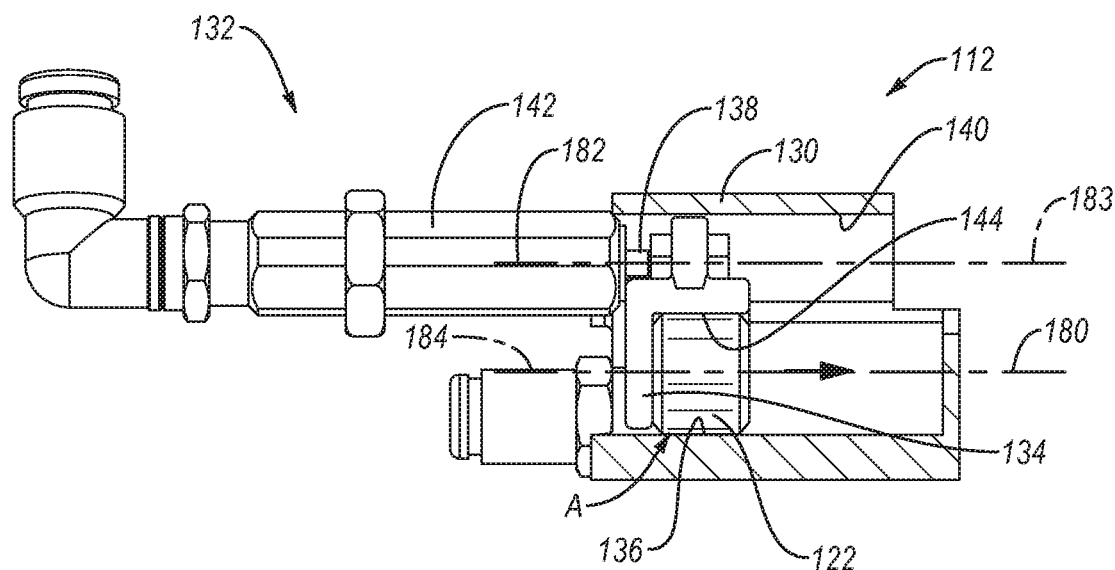
FIG. 11 is a schematic, plan, sectional view of the guide-block assembly of FIGS. 8 and 9, according to one or more examples of the subject matter, disclosed herein.
Figure 12:
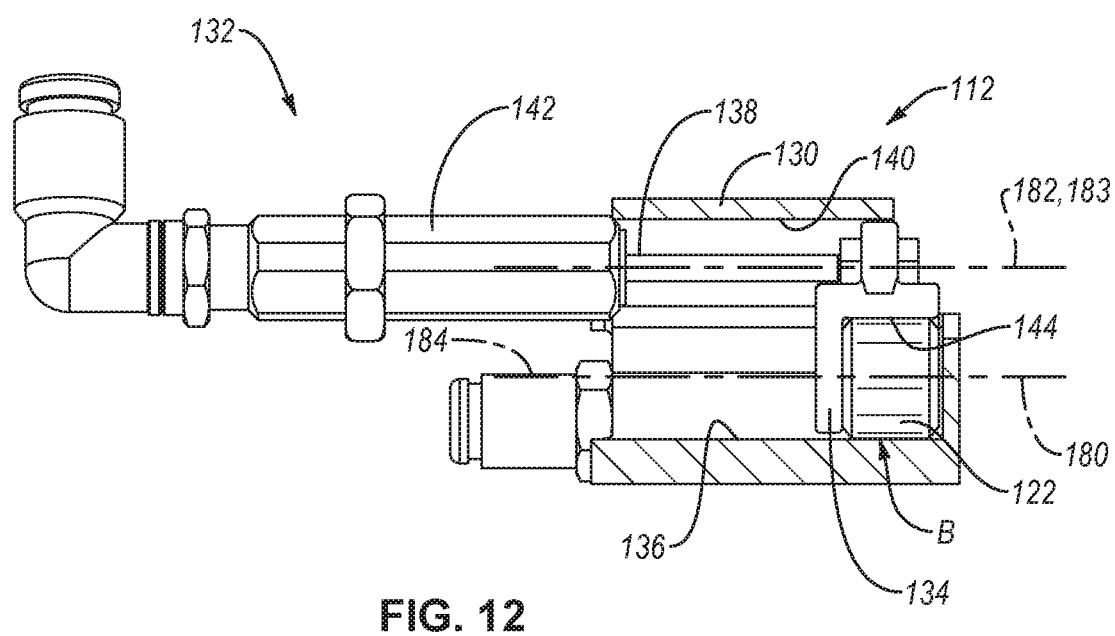
FIG. 12 is a schematic, plan, sectional view of the guide-block assembly of FIGS. 8 and 9, according to one or more examples of the subject matter, disclosed herein.

Referring generally to FIGS. 1A, 1B, and 1C and particularly to, e.g., FIGS. 11-13 for illustrative purposes only and not by way of limitation, end effector 100 for swaging operations is disclosed. End effector 100 comprises swage gun 104 and feeder 102. Feeder 102 comprises collar magazine 110 that is configured to selectively eject lock collar 122, which has collar axis 180. Feeder 102 also comprises guide-block assembly 112. Guide-block assembly 112 comprises guide block 130 that comprises slot 136 that is configured to receive lock collar 122 from collar magazine 110 at first guide-block position A along slot 136. Guide-block assembly 112 also comprises actuator 132 that is operable to move lock collar 122 along slot 136 from first guide-block position A to second guide-block position B that is spaced away from first guide-block position A. Feeder 102 also comprises feed tunnel 114 that is coupled with guide-block assembly 112. Feeder 102 further comprises dispensing bulkhead 116 that is coupled with feed tunnel 114. Feeder 102 additionally comprises gripping assembly 118 that is coupled with dispensing bulkhead 116 and rotatable relative to swage gun 104. The preceding portion of this paragraph characterizes example thirty-two of the subject matter, disclosed herein.

End effector 100 promotes automated delivery of the lock collars and performance of swaging operations in confined locations without the need to manually access such locations. Feeder 102 provides for the delivery of lock collars to assembly fasteners 172 in such confined locations. Collar magazine 110 enables storage and incremental feeding of many lock collars at a time in preparation for swaging operations. Guide-block assembly 112 enables collar magazine 110 to drop the lock collars out of collar magazine 110 and helps to position a single lock collar at a time from collar magazine 110 into a position, conducive for transitioning into feed tunnel 114. Feed tunnel 114 promotes retention of several lock collars in preparation for delivery to dispensing bulkhead 116. Dispensing bulkhead 116 facilitates secure movement of the lock collars for delivery to gripping assembly 118 while enabling gripping assembly 118 to retrieve a single lock collar at a time from dispensing bulkhead 116. Gripping assembly 118 enables retention of lock collar 122 from dispensing bulkhead 116 and reorientation of lock collar 122 into an orientation, conducive to swaging operations by swage gun 104. Accordingly, feeder 102 promotes the transfer of the lock collars from a centralized storage location and the dispensing of the lock collars individually in front of swage gun 104.

In one or more examples, end effector 100 is operably coupled with an end of a robot or robotic arm mechanism, which is configured to move end effector 100 into position for swaging operations.

Referring generally to FIGS. 1A, 1B, and 1C and particularly to, e.g., FIGS. 7-9 and 13 for illustrative purposes only and not by way of limitation, collar magazine 110 is further configured to selectively eject lock collar 122 with collar axis 180 perpendicular to swaging axis 186 of swage gun 104. Slot 136 is further configured to receive lock collar 122 from collar magazine 110 with collar axis 180 perpendicular to swaging axis 186. The preceding portion of this paragraph characterizes example thirty-three of the subject matter, disclosed herein, where example thirty-three also encompasses example thirty-two, above.

Collar magazine 110 and slot 136 enables movement of lock collar 122 from collar magazine 110 to slot 136 in a precise, efficient, and reliable manner, and in a manner that maintains collar axis 180 perpendicular to swaging axis 186.

Referring generally to FIGS. 1A, 1B, and 1C and particularly to, e.g., FIG. 13 for illustrative purposes only and not by way of limitation, feeder 102 further comprises guide-block pneumatic source 145 that is configured to selectively generate a pneumatic pulse. Guide-block assembly 112 further comprises pneumatic passage 146, which is fluidically coupled with guide-block pneumatic source 145 and is in fluidic communication with slot 136 of guide block 130. The pneumatic pulse that is generated by guide-block pneumatic source 145 transfers lock collar 122 from slot 136 to feed tunnel 114. The preceding portion of this paragraph characterizes example thirty-four of the subject matter, disclosed herein, where example thirty-four also encompasses example thirty-three, above.

The pneumatic pulse from guide-block pneumatic source 145 enables movement of lock collar 122 from slot 136 of guide block 130 to feed tunnel 114 in a precise, efficient, and reliable manner.

Referring generally to FIGS. 1A, 1B, and 1C and particularly to, e.g., FIGS. 2, 4, and 8-14 for illustrative purposes only and not by way of limitation, guide-block pneumatic source 145 is further configured to selectively generate the pneumatic pulse when lock collar 122 is in second guide-block position B along slot 136 of guide block 130. Feed tunnel 114 receives lock collar 122 from guide block 130 with collar axis 180 perpendicular to swaging axis 186 when the pneumatic pulse that is generated by guide-block pneumatic source 145 transfers lock collar 122 from slot 136 to feed tunnel 114. The preceding portion of this paragraph characterizes example thirty-five of the subject matter, disclosed herein, where example thirty-five also encompasses example thirty-four, above.

Feed tunnel 114, receiving lock collar 122 from slot 136 of guide block 130, enables feeding of lock collar 122 away from guide block 130 in a manner that maintains lock collar 122 in orientation where collar axis 180 of lock collar 122 is perpendicular to swaging axis 186.

Referring generally to FIGS. 1A, 1B, and 1C and particularly to, e.g., FIG. 14 for illustrative purposes only and not by way of limitation, dispensing bulkhead 116 is configured to receive lock collar 122 from feed tunnel 114 with collar axis 180 perpendicular to swaging axis 186. The preceding portion of this paragraph characterizes example thirty-six of the subject matter, disclosed herein, where example thirty-six also encompasses example thirty-five, above.

Dispensing bulkhead 116, receiving lock collar 122 from feed tunnel 114, enables feeding of lock collar 122 from feed tunnel 114 to dispensing bulkhead 116 in a manner that maintains lock collar 122 in orientation where collar axis 180 of lock collar 122 is perpendicular to swaging axis 186.

Referring generally to FIGS. 1A, 1B, and 1C and particularly to, e.g., FIGS. 14-18 for illustrative purposes only and not by way of limitation, lock collar 122 is movable along dispensing bulkhead 116 from first dispensing-bulkhead position C to second dispensing-bulkhead position D that is spaced away from first dispensing-bulkhead position C. The preceding portion of this paragraph characterizes example thirty-seven of the subject matter, disclosed herein, where example thirty-seven also encompasses example thirty-six, above.

Lock collar 122, being movable along dispensing bulkhead 116, enables lock collar 122 to be moved into a position, in which gripping assembly 118 can retrieve lock collar 122 in preparation for delivery to swage gun 104.

Referring generally to FIGS. 1A, 1B, and 1C and particularly to, e.g., FIG. 14 for illustrative purposes only and not by way of limitation, dispensing bulkhead 116 comprises dispensing channel 166, which has dispensing-channel inlet 187 and dispensing-channel outlet 189. Lock collar 122 is movable along dispensing channel 166 from dispensing-channel inlet 187 to dispensing-channel outlet 189. Feed tunnel 114 has feed-tunnel inlet 181 and feed-tunnel outlet 185. Lock collar 122 is movable along feed tunnel 114 from feed-tunnel inlet 181 to feed-tunnel outlet 185. Dispensing-channel inlet 187 is in communication with feed-tunnel outlet 185 to receive lock collar 122 from feed-tunnel outlet 185. The preceding portion of this paragraph characterizes example thirty-eight of the subject matter, disclosed herein, where example thirty-eight also encompasses example thirty-seven, above.

Dispensing channel 166 of dispensing bulkhead 116 helps to move lock collar 122 away from feed tunnel to provide clearance for gripping assembly 118 to move into close proximity with dispensing bulkhead 116 for retrieving lock collar 122 from dispensing bulkhead 116.

Referring generally to FIGS. 1A, 1B, and 1C and particularly to, e.g., FIGS. 4 and 14-22 for illustrative purposes only and not by way of limitation, dispensing bulkhead 116 comprises retention assembly 188 that is configured to releasably retain lock collar 122 in second dispensing-bulkhead position D so that collar axis 180 of lock collar 122 is perpendicular to swaging axis 186. The preceding portion of this paragraph characterizes example thirty-nine of the subject matter, disclosed herein, where example thirty-nine also encompasses example thirty-eight, above.

Retention assembly 188 provides a mechanism that sufficiently secures lock collar 122 in anticipation of retrieval by gripping assembly 118, but also enables gripping assembly 118 to retrieve lock collar 122 when needed for deliver to swage gun 104.

Referring generally to FIGS. 1A, 1B, and 1C and particularly to, e.g., FIGS. 14 and 16 for illustrative purposes only and not by way of limitation, retention assembly 188 of dispensing bulkhead 116 is configured to receive lock collar 122 from dispensing-channel outlet 189. Lock collar 122 is movable along retention assembly 188 in a first direction. Retention assembly 188 is configured to prevent movement of lock collar 122 in second direction 194, which is perpendicular to first direction 192, and in third direction 196, which is perpendicular to first direction 192 and to second direction 194. The preceding portion of this paragraph characterizes example forty of the subject matter, disclosed herein, where example forty also encompasses example thirty-nine, above.

Constraining movement of lock collar 122 in second direction 194 and third direction 196 helps retain lock collar 122 in an orientation where collar axis 180 of lock collar 122 is perpendicular to swaging axis 186 as lock collar 122 moves along retention assembly 188 in first direction 192.

Referring generally to FIGS. 1A, 1B, and 1C and particularly to, e.g., FIGS. 14-22 for illustrative purposes only and not by way of limitation, retention assembly 188 comprises pair of first retention arms 162, spaced apart from each other and configured to prevent movement of lock collar 122 in second direction 194. Retention assembly 188 also comprises pair of second retention arms 164, spaced apart from each other and configured to prevent movement of lock collar 122 in third direction 196. The preceding portion of this paragraph characterizes example forty-one of the subject matter, disclosed herein, where example forty-one also encompasses example forty, above.

Pair of first retention arms 162 and pair of second retention arms 164 enable retention of lock collar 122 in a manner that enables gripping assembly 118 to grip lock collar 122 when releasably retained by retention assembly 188 of dispensing bulkhead 116.

Referring generally to FIGS. 1A, 1B, and 1C and particularly to, e.g., FIGS. 14-22 for illustrative purposes only and not by way of limitation, pair of second retention arms 164 is resiliently flexible. The preceding portion of this paragraph characterizes example forty-two of the subject matter, disclosed herein, where example forty-two also encompasses example forty-one, above.

The second retention arms of pair of second retention arms 164, being resiliently flexible, enable releasable retention of lock collar 122 in second dispensing-bulkhead position D and gripping assembly 118 to remove lock collar 122 from retention assembly 188 of dispensing bulkhead 116.

Referring generally to FIGS. 1A, 1B, and 1C and particularly to, e.g., FIGS. 14-19 for illustrative purposes only and not by way of limitation, pair of second retention arms 164 defines neck space 167 and receptacle space 169. Neck space 167 is between dispensing-channel outlet 189 and receptacle space 169. Neck space 167 is narrower than receptacle space 169. The preceding portion of this paragraph characterizes example forty-three of the subject matter, disclosed herein, where example forty-three also encompasses example forty-two, above.

The second retention arms of pair of second retention arms 164, by defining neck space 167 and receptacle space 169, enable lock collar 122 to be separated from other lock collars in dispensing channel 166 and positioned in second dispensing-bulkhead position D for retrieval by gripping assembly 118 in a passive and controlled manner.

Referring generally to FIGS. 1A, 1B, and 1C and particularly to, e.g., FIGS. 14-19 for illustrative purposes only and not by way of limitation, portions of pair of second retention arms 164 that define receptacle space 169 are concave. The preceding portion of this paragraph characterizes example forty-four of the subject matter, disclosed herein, where example forty-four also encompasses example forty-three, above.

The contoured portions of pair of second retention arms 164 enable secure retention of lock collar 122 in second dispensing-bulkhead position D.

Referring generally to FIGS. 1A, 1B, and 1C and particularly to, e.g., FIGS. 2, 4, 5, and 18-23 for illustrative purposes only and not by way of limitation, gripping assembly 118 comprises gripper 120. Gripping assembly 118 is pivotable, relative to dispensing bulkhead 116, to a collar-receiving position, in which gripper 120 is configured to receive lock collar 122, when lock collar 122 is in second dispensing-bulkhead position D, from retention assembly 188 of dispensing bulkhead 116, and to a collar-delivering position, in which lock collar 122 that is received by gripper 120 from retention assembly 188 is oriented so that collar axis 180 of lock collar 122 is parallel to swaging axis 186. The preceding portion of this paragraph characterizes example forty-five of the subject matter, disclosed herein, where example forty-five also encompasses any one of examples forty to forty-four, above.

Gripping assembly 118 provides for efficiently reorienting lock collar 122 from one orientation, conducive to storing and feeding multiple lock collars, to another orientation, conducive to a swaging operation by swage gun 104, in an angular sweeping motion.

Referring generally to FIGS. 1A, 1B, and 1C and particularly to, e.g., FIGS. 14-23 for illustrative purposes only and not by way of limitation, gripper 120 comprises first gripper arm 156A and second gripper arm 156B. When lock collar 122 is releasably retained by retention assembly 188, first gripper arm 156A and second gripper arm 156B are movable toward each other to grasp lock collar 122 The preceding portion of this paragraph characterizes example forty-six of the subject matter, disclosed herein, where example forty-six also encompasses example forty-five, above.

First gripper arm 156A and second gripper arm 156B, being movable toward each other, enable secure retention of lock collar 122 by gripper 120, from retention assembly 188, without interfering with retention assembly 188. In some examples, gripper 120 further comprises first base 158A, to which first gripper arm 156A is pivotably coupled, and second base 158B, to which second gripper arm 156B is pivotably coupled.

Referring generally to FIGS. 1A, 1B, and 1C and particularly to, e.g., FIGS. 14-23 for illustrative purposes only and not by way of limitation, first gripper arm 156A and second gripper arm 156B are biased toward each other. The preceding portion of this paragraph characterizes example forty-seven of the subject matter, disclosed herein, where example forty-seven also encompasses example forty-six, above.

First gripper arm 156A and second gripper arm 156B, being biased toward each other, promote quick and passively actuated releasable retention of lock collar 122.

Referring generally to FIGS. 1A, 1B, and 1C and particularly to, e.g., FIG. 14 for illustrative purposes only and not by way of limitation, gripping assembly 118 further comprises first spring 169A that is configured to bias first gripper arm 156A toward second gripper arm 156B. Gripping assembly 118 also comprises second spring 169B that is configured to bias second gripper arm 156B toward first gripper arm 156A. The preceding portion of this paragraph characterizes example forty-eight of the subject matter, disclosed herein, where example forty-eight also encompasses example forty-seven, above.

First spring 169A and second spring 169B facilitate a simple and reliable way to bias first gripper arm 156A and second gripper arm 156B toward each other.

Referring generally to FIGS. 1A, 1B, and 1C and particularly to, e.g., FIG. 14 for illustrative purposes only and not by way of limitation, retention assembly 188 is configured to releasably retain lock collar 122 with a first biasing force. First spring 169A biases first gripper arm 156A toward second gripper arm 156B with a second biasing force. Second spring 169B biases second gripper arm 156B toward first gripper arm 156A with a third biasing force. Second biasing force and the third biasing force, in combination, are greater than the first biasing force. The preceding portion of this paragraph characterizes example forty-nine of the subject matter, disclosed herein, where example forty-nine also encompasses example forty-eight, above.

The sum of the second biasing force and the third biasing force, being greater than the first biasing force, enables retention assembly 188 to sufficiently retain lock collar 122 in second dispensing-bulkhead position D when not acted upon by gripper 120 and to release lock collar 122 to gripper 120 when lock collar 122 in second dispensing-bulkhead position D is acted upon by gripper 120 as gripping assembly 118 pivots from collar-receiving position to collar-delivering position.

Referring generally to FIGS. 1A, 1B, and 1C and particularly to, e.g., FIGS. 14-20 for illustrative purposes only and not by way of limitation, retention assembly 188 comprises pair of first retention arms 162, configured to prevent movement of lock collar 122 in second direction 194. First gripper arm 156A comprises first retention-arm slot 157A that receives a first one of pair of first retention arms 162 when gripping assembly 118 is in the collar-receiving position. Second gripper arm 156B comprises second retention-arm slot 157B that receives a second one of pair of first retention arms 162 when gripping assembly 118 is in the collar-receiving position. The preceding portion of this paragraph characterizes example fifty of the subject matter, disclosed herein, where example fifty also encompasses any one of examples forty-seven to forty-nine, above.

First retention-arm slot 157A of first gripper arm 156A and second retention-arm slot 157B of second gripper arm 156B enables gripper 120 to move into position, relative to lock collar 122, and engage lock collar 122 without affecting retention of lock collar in second dispensing-bulkhead position D by pair of first retention arms 162.

Referring generally to FIGS. 1A, 1B, and 1C and particularly to, e.g., FIGS. 14-20 for illustrative purposes only and not by way of limitation, first gripper arm 156A and second gripper arm 156B are biased toward each other. First gripper arm 156A comprises first neck projections 171A that straddle first retention-arm slot 157A. First gripper arm 156A also comprises first collar receptacles 173A that straddle first retention-arm slot 157A. Second gripper arm 156B comprises second neck projections 171B that straddle second retention-arm slot 157B. Second gripper arm 156B also comprises second collar receptacles 173B that straddle second retention-arm slot 157B. As gripping assembly 118 pivots from the collar-delivering position to the collar-receiving position: the first one of pair of first retention arms 162 is received in first retention-arm slot 157A of first gripper arm 156A; the second one of pair of first retention arms 162 is received in second retention-arm slot 157B of second gripper arm 156B; lock collar 122, when in second dispensing-bulkhead position D, engages first neck projections 171A of first gripper arm 156A and second neck projections 171B of second gripper arm 156B to move first gripper arm 156A and second gripper arm 156B away from each other; and after lock collar 122 in second dispensing-bulkhead position D engages first neck projections 171A of first gripper arm 156A and second neck projections 171B of second gripper arm 156B, first gripper arm 156A and second gripper arm 156B are urged toward each other to receive lock collar 122, in second dispensing-bulkhead position D, in first collar receptacles 173A of first gripper arm 156A and second collar receptacles 173B of second gripper arm 156B. The preceding portion of this paragraph characterizes example fifty-one of the subject matter, disclosed herein, where example fifty-one also encompasses example fifty, above.

First neck projections 171A and second neck projections 171B of first gripper arm 156A and second gripper arm 156B, respectively, enable opening of gripper 120 to receive lock collar 122 as gripping assembly 118 pivots into collar-receiving position. First collar receptacle 173A and second collar receptacle 173B of first gripper arm 156A and second gripper arm 156B, respectively, enables secure retention of lock collar 122 by gripper 120.

Referring generally to FIGS. 1A, 1B, and 1C and particularly to, e.g., FIGS. 2, 3, 6, and 7 for illustrative purposes only and not by way of limitation, collar magazine 110 comprises collar-retention channel 124, configured to retain lock collar 122 so that collar axis 180 is perpendicular to swaging axis 186. The preceding portion of this paragraph characterizes example fifty-two of the subject matter, disclosed herein, where example fifty-two also encompasses any one of examples thirty-three to fifty-one, above.

Collar-retention channel 124 of collar magazine 110 enables feeder 102 to perform multiple swaging operations without having to replenish a supply of lock collars to feeder 102.

Referring generally to FIGS. 1A, 1B, and 1C and particularly to, e.g., FIGS. 3, 6, and 7 for illustrative purposes only and not by way of limitation, collar-retention channel 124 follows a serpentine path through collar magazine 110. The preceding portion of this paragraph characterizes example fifty-three of the subject matter, disclosed herein, where example fifty-three also encompasses example fifty-two, above.

Collar-retention channel 124, by following a serpentine path, which winds through collar magazine 110, helps to maximize a capacity of collar magazine 110 to retain lock collars, which promotes a reduction in the frequency of replenishment of the supply of lock collars to feeder 102.

Referring generally to FIGS. 1A, 1B, and 1C and particularly to, e.g., FIGS. 7 and 9 for illustrative purposes only and not by way of limitation, feeder 102 further comprises collar-magazine pneumatic source 159 that is configured to selectively generate a pneumatic pulse. Collar-retention channel 124 of collar magazine 110 comprises channel inlet 126 and channel outlet 128. Channel inlet 126 is fluidically coupled with collar-magazine pneumatic source 159. Slot 136 of guide block 130 is configured to receive lock collar 122 from channel outlet 128 of collar-retention channel 124. When channel inlet 126 of collar-retention channel 124 receives the pneumatic pulse that is selectively generated by collar-magazine pneumatic source 159, collar magazine 110 ejects lock collar 122 from channel outlet 128 into slot 136 of guide block 130. The preceding portion of this paragraph characterizes example fifty-four of the subject matter, disclosed herein, where example fifty-four also encompasses example fifty-two or fifty-three, above.

The pneumatic pulse from collar-magazine pneumatic source 159 enables movement of lock collar 122 from channel inlet 126 to channel outlet 128 and facilitates ejection of lock collar 122 from channel outlet 128 in a precise, efficient, and reliable manner.

Referring generally to FIGS. 1A, 1B, and 1C and particularly to, e.g., FIGS. 7-14 for illustrative purposes only and not by way of limitation, guide-block assembly 112 further comprises paddle 134 that is coupled to actuator 132. Paddle 134 is movable along slot 136 of guide block 130 by actuator 132 to push lock collar 122 from first guide-block position A to second guide-block position B. The preceding portion of this paragraph characterizes example fifty-five of the subject matter, disclosed herein, where example fifty-five also encompasses any one of examples thirty-two to fifty-four, above.

Paddle 134 makes it possible to move lock collar 122 along slot 136 of guide block 130 in an efficient manner.

Referring generally to FIGS. 1A, 1B, and 1C and particularly to, e.g., FIGS. 7-14 for illustrative purposes only and not by way of limitation, actuator 132 defines working axis 182 and comprises linear rod 138 that is coaxial with and movable along working axis 182. Paddle 134 is coupled with linear rod 138. Collar axis 180 is offset from working axis 182 of actuator 132 when lock collar 122 is in slot 136. The preceding portion of this paragraph characterizes example fifty-six of the subject matter, disclosed herein, where example fifty-six also encompasses example fifty-five, above.

Paddle 134, extending from working axis 182 to collar axis 180 of lock collar 122, and working axis 182 being offset relative to collar axis 180 of lock collar 122, when lock collar 122 is in slot 136, facilitates convenient assembly of actuator 132 and guide block 130.

Referring generally to FIGS. 1A, 1B, and 1C and particularly to, e.g., FIGS. 8, 10-12, and 14 for illustrative purposes only and not by way of limitation, guide block 130 further comprises actuator-assembly opening 140 that has central axis 183 that is collinear with working axis 182 of actuator 132. The preceding portion of this paragraph characterizes example fifty-seven of the subject matter, disclosed herein, where example fifty-seven also encompasses example fifty-six, above.

Actuator-assembly opening 140 provides access through which paddle 134 can be fixed to linear rod 138 after paddle 134 is positioned within slot 136 during an assembly operation of guide-block assembly 112.

Referring generally to FIGS. 1A, 1B, and 1C and particularly to, e.g., FIG. 14 for illustrative purposes only and not by way of limitation, feed tunnel 114 comprises spring-loaded retainer 154 that is configured to prevent lock collar 122 from passing from feed tunnel 114 to guide-block assembly 112. The preceding portion of this paragraph characterizes example fifty-eight of the subject matter, disclosed herein, where example fifty-eight also encompasses any one of examples thirty-two to fifty-seven, above.

Spring-loaded retainer 154 helps to reduce the number of lock collars that need to be in dispensing bulkhead 116 for feeder 102 to operate, which promotes a reduction in material waste.

Referring generally to FIGS. 1A, 1B, and 1C and particularly to, e.g., FIG. 14 for illustrative purposes only and not by way of limitation, feed tunnel 114 and dispensing bulkhead 116 collectively define lock-collar path 148, which has an arcuate shape. The preceding portion of this paragraph characterizes example fifty-nine of the subject matter, disclosed herein, where example fifty-nine also encompasses any one of examples thirty-two to fifty-eight, above.

Lock-collar path 148, having an arcuate shape, provides clearance for gripper 120 to move into close proximity with dispensing bulkhead 116 for retrieving lock collar 122 from dispensing bulkhead 116.

Referring generally to FIGS. 1A, 1B, and 1C and particularly to, e.g., FIG. 5 for illustrative purposes only and not by way of limitation, feeder 102 further comprises body 151 with which collar magazine 110, guide-block assembly 112, feed tunnel 114, dispensing bulkhead 116, and gripping assembly 118 are coupled. Body 151 comprises linear channel 147. Collar magazine 110 comprises linear tab 165. Linear channel 147 receives linear tab 165 to couple collar magazine 110 to body 151. The preceding portion of this paragraph characterizes example sixty of the subject matter, disclosed herein, where example sixty also encompasses any one of examples thirty-two to fifty-nine, above.

Linear channel 147 helps to guide linear tab 165 of collar magazine 110 into engagement with body 151.

Referring generally to FIGS. 1A, 1B, and 1C and particularly to, e.g., FIGS. 5 and 7 for illustrative purposes only and not by way of limitation, body 151 further comprises spring-loaded body plunger 141. Collar magazine 110 further comprises dimple 143. Dimple 143 is releasably engageable with spring-loaded body plunger 141 to prevent movement of collar magazine 110 relative to body 151. The preceding portion of this paragraph characterizes example sixty-one of the subject matter, disclosed herein, where example sixty-one also encompasses example sixty, above.

Spring-loaded body plunger 141 provides a mechanism that keeps collar magazine 110 engaged with body 151 unless a force, overcoming the biasing force of spring-loaded body plunger 141, is applied to collar magazine 110 to remove collar magazine 110 from body 151.

Referring generally to FIGS. 1A, 1B, and 1C and particularly to, e.g., FIG. 7 for illustrative purposes only and not by way of limitation, collar magazine 110 comprises spring-loaded magazine plunger 149 that releasably retains lock collar 122 in collar magazine 110. The preceding portion of this paragraph characterizes example sixty-two of the subject matter, disclosed herein, where example sixty-two also encompasses any one of examples thirty-two to sixty-one, above.

Spring-loaded magazine plunger 149 provides a mechanism that keeps lock collars in collar magazine 110 unless lock collars in collar magazine 110 receive a pneumatic pulse from collar-magazine pneumatic source 159.

Figure 25:
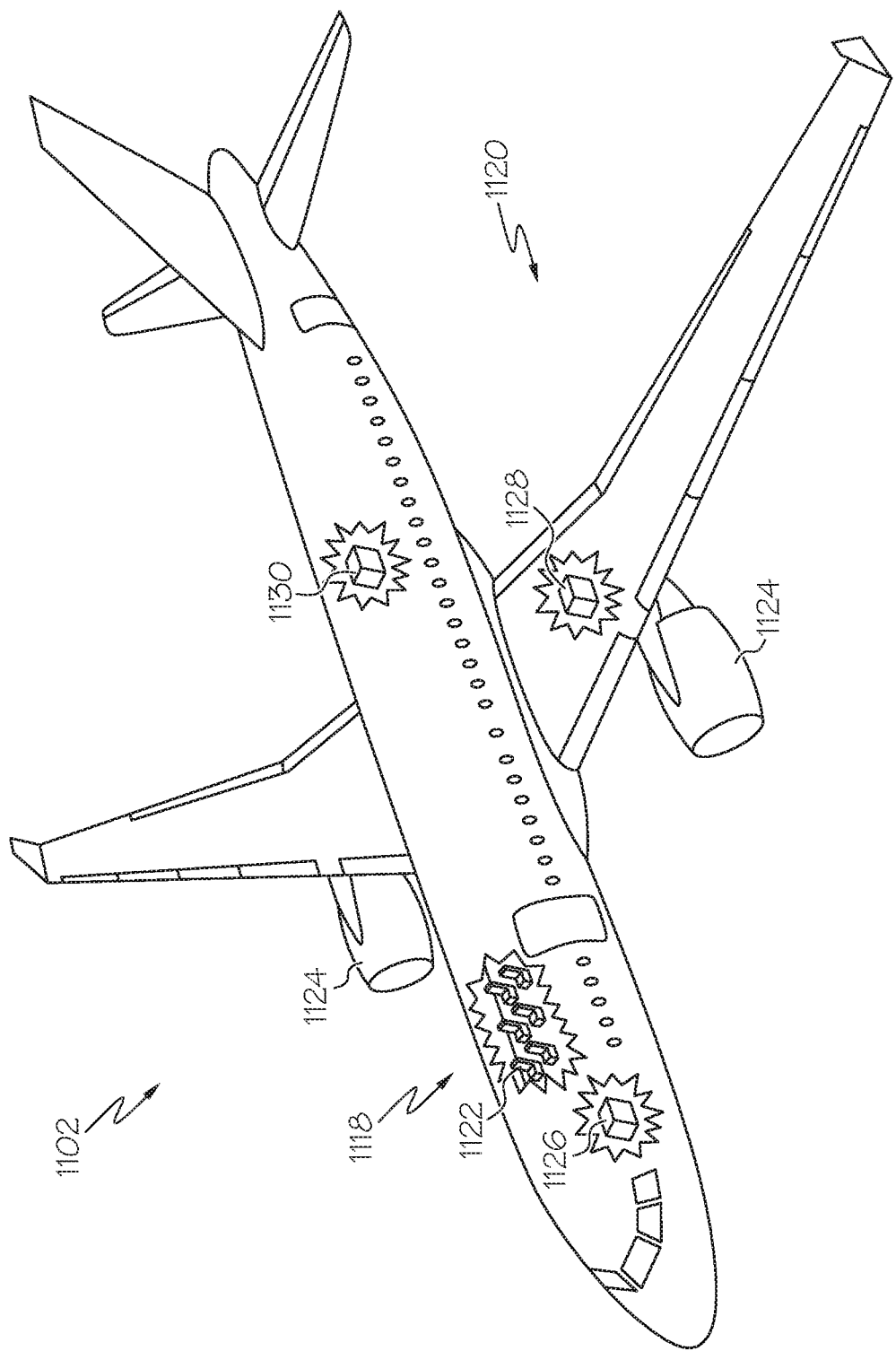
FIG. 25 is a schematic illustration of an aircraft.

Examples of the subject matter, disclosed herein may be described in the context of aircraft manufacturing and service method 1100 as shown in FIG. 24 and aircraft 1102 as shown in FIG. 25. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 25, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A feeder for a swage gun, the feeder comprising:
    a collar magazine, configured to selectively eject a lock collar that has a collar axis;
    a guide-block assembly, comprising:
        a guide block that comprises a slot, configured to receive the lock collar from the collar magazine at a first guide-block position along the slot; and
        an actuator, operable to move the lock collar along the slot from the first guide-block position to a second guide-block position, spaced away from the first guide-block position;
    a feed tunnel, coupled with the guide-block assembly;
    a dispensing bulkhead coupled with the feed tunnel; and
    a gripping assembly, coupled with the dispensing bulkhead and comprising a first gripper arm and a second gripper arm,
    wherein:
        the dispensing bulkhead comprises a retention assembly, configured to releasably retain the lock collar in the dispensing bulkhead;
        the lock collar is movable along the retention assembly in a first direction; and
        the retention assembly comprises:
            a pair of first retention arms, spaced apart from each other and configured to prevent movement of the lock collar in a second direction, which is perpendicular to the first direction; and
            a pair of second retention arms, spaced apart from each other and configured to prevent movement of the lock collar in a third direction, which is perpendicular to the first direction and to the second direction.

2. The feeder of claim 1, wherein:
    the collar magazine is further configured to selectively eject the lock collar with the collar axis perpendicular to a swaging axis of the swage gun; and
    the slot is further configured to receive the lock collar from the collar magazine with the collar axis (180) perpendicular to the swaging axis.

3. The feeder according to claim 2, wherein:
    the feeder further comprises a guide-block pneumatic source, configured to selectively generate a pneumatic pulse;
    the guide-block assembly further comprises a pneumatic passage, which is fluidically coupled with the guide-block pneumatic source and is in fluidic communication with the slot of the guide block; and
    the pneumatic pulse, generated by the guide-block pneumatic source, transfers the lock collar from the slot to the feed tunnel.

4. The feeder according to claim 3, wherein:
    the guide-block pneumatic source is further configured to selectively generate the pneumatic pulse when the lock collar is in the second guide-block position a long the slot of the guide block; and
    the feed tunnel receives the lock collar from the guide block with the collar axis perpendicular to the swaging axis when the pneumatic pulse, generated by the guide-block pneumatic source, transfers the lock collar from the slot to the feed tunnel.

5. The feeder according to claim 4, wherein the dispensing bulkhead is configured to receive the lock collar from the feed tunnel with the collar axis perpendicular to the swaging axis.

6. The feeder according to claim 5, wherein the lock collar is movable along the dispensing bulkhead from a first dispensing-bulkhead position to a second dispensing-bulkhead position, spaced away from the first dispensing-bulkhead position.

7. The feeder according to claim 6, wherein:
    the dispensing bulkhead comprises a dispensing channel, which has a dispensing-channel inlet and a dispensing-channel outlet;
    the lock collar is movable along the dispensing channel from the dispensing-channel inlet to the dispensing-channel outlet;
    the feed tunnel has a feed-tunnel inlet and a feed-tunnel outlet;
    the lock collar is movable along the feed tunnel from the feed-tunnel inlet to the feed-tunnel outlet; and the dispensing-channel inlet is in communication with the feed-tunnel outlet to receive the lock collar from the feed-tunnel outlet.

8. The feeder according to claim 7, wherein the retention assembly of the dispensing bulkhead is configured to receive the lock collar from the dispensing-channel outlet.

9. The feeder according to claim 8, wherein:
the gripping assembly comprises a gripper; and
the gripping assembly is pivotable, relative to the dispensing bulkhead, to a collar-receiving position, in which the gripper is configured to receive the lock collar, when the lock collar is in the second dispensing-bulkhead position, from the retention assembly of the dispensing bulkhead, and to a collar-delivering position, in which the lock collar, received by the gripper from the retention assembly, is oriented so that the collar axis of the lock collar is parallel to the swaging axis.

10. The feeder according to claim 9, wherein, when the lock collar is releasably retained by the retention assembly, the first gripper arm and the second gripper arm are movable toward each other to grasp the lock collar.

11. The feeder according to claim 10, wherein the first gripper arm and the second gripper arm are biased toward each other.

12. The feeder according to claim 11, wherein the gripping assembly further comprises:
a first spring (169A), configured to bias the first gripper arm toward the second gripper arm; and
a second spring (169B), configured to bias the second gripper arm toward the first gripper arm.

13. The feeder according to claim 12, wherein:
the retention assembly is configured to releasably retain the lock collar with a first biasing force;
the first spring biases the first gripper arm toward the second gripper arm with a second biasing force;
the second spring biases the second gripper arm toward the first gripper arm with a third biasing force; and
the second biasing force and the third biasing force, in combination, are greater than the first biasing force.

14. The feeder according to claim 11, wherein:
the first gripper arm comprises a first retention-arm slot that receives a first one of the pair of first retention arms when the gripping assembly is in the collar-receiving position; and
the second gripper arm comprises a second retention-arm slot that receives a second one of the pair of first retention arms when the gripping assembly is in the collar-receiving position.

15. The feeder according to claim 14, wherein:
the first gripper arm further comprises:
first neck projections that straddle the first retention-arm slot; and
first collar receptacles that straddle the first retention-arm slot;
the second gripper arm further comprises:
second neck projections that straddle the second retention-arm slot; and
second collar receptacles that straddle the second retention-arm slot; and
as the gripping assembly pivots from the collar-delivering position to the collar-receiving position:
the first one of the pair of first retention arms is received in the first retention-arm slot of the first gripper arm;
the second one of the pair of first retention arms is received in the second retention-arm slot of the second gripper arm;
the lock collar, when in the second dispensing-bulkhead position, engages the first neck projections of the first gripper arm and the second neck projections of the second gripper arm to move the first gripper arm and the second gripper arm away from each other; and
after the lock collar in the second dispensing-bulkhead position engages the first neck projections of the first gripper arm and the second neck projections of the second gripper arm, the first gripper arm and the second gripper arm are urged toward each other to receive the lock collar, in the second dispensing-bulkhead position, in the first collar receptacles of the first gripper arm and the second collar receptacles of the second gripper arm.

16. The feeder according to claim 7, wherein the pair of second retention arms is resiliently flexible.

17. The feeder according to claim 16, wherein:
the pair of second retention arms defines a neck space and a receptacle space;
the neck space is between the dispensing-channel outlet and the receptacle space; and
the neck space is narrower than the receptacle space.

18. The feeder according to claim 17, wherein portions of the pair of second retention arms, defining the receptacle space, are concave.

19. The feeder according to claim 2, wherein the collar magazine comprises a collar-retention channel, configured to retain the lock collar so that the collar axis is perpendicular to the swaging axis.

20. An end effector for swaging operations, the end effector comprising:
a swage gun; and
a feeder, comprising:
a collar magazine, configured to selectively eject a lock collar, the lock collar having a collar axis;
a guide-block assembly, comprising:
a guide block that comprises a slot, configured to receive the lock collar from the collar magazine at a first guide-block position along the slot; and
an actuator, operable to move the lock collar along the slot from the first guide-block position to a second guide-block position, spaced away from the first guide-block position;
a feed tunnel, coupled with the guide-block assembly;
a dispensing bulkhead, coupled with the feed tunnel; and
a gripping assembly, coupled with the dispensing bulkhead, rotatable relative to the swage gun, and comprising a first gripper arm and a second gripper arm,
wherein:
the dispensing bulkhead comprises a retention assembly, configured to releasably retain the lock collar in the dispensing bulkhead;
the lock collar is movable along the retention assembly in a first direction; and
the retention assembly comprises:
a pair of first retention arms, spaced apart from each other and configured to prevent movement of the lock collar in a second direction, which is perpendicular to the first direction; and
a pair of second retention arms, spaced apart from each other and configured to prevent movement of the lock collar in a third direction, which is perpendicular to the first direction and to the second direction.

\* \* \* \* \*